United States Patent
Tutin et al.

(10) Patent No.: US 9,133,334 B2
(45) Date of Patent: *Sep. 15, 2015

(54) DEDUSTING AGENTS FOR FIBERGLASS PRODUCTS AND METHODS FOR MAKING AND USING SAME

(71) Applicant: Georgia-Pacific Chemicals LLC, Atlanta, GA (US)

(72) Inventors: Kim Tutin, East Point, GA (US); Phillip W. Hurd, Conyers, GA (US); Kelly A. Shoemake, Atlanta, GA (US); Brian L. Swift, Oxford, GA (US); Michael C. Peck, Snellville, GA (US); Lisa M. Arthur, Conyers, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 86 days.

This patent is subject to a terminal disclaimer.

(21) Appl. No.: 14/021,262

(22) Filed: Sep. 9, 2013

(65) Prior Publication Data

US 2014/0001396 A1    Jan. 2, 2014

Related U.S. Application Data

(63) Continuation of application No. 12/875,064, filed on Sep. 2, 2010, now Pat. No. 8,551,355, which is a continuation-in-part of application No. 12/533,726, filed on Jul. 31, 2009, now Pat. No. 8,133,408.

(60) Provisional application No. 61/085,840, filed on Aug. 2, 2008, provisional application No. 61/239,161, filed on Sep. 2, 2009.

(51) Int. Cl.
*C09K 3/22* (2006.01)
*C08L 61/06* (2006.01)
*D04H 3/004* (2012.01)

(52) U.S. Cl.
CPC . *C08L 61/06* (2013.01); *C09K 3/22* (2013.01); *D04H 3/004* (2013.01)

(58) Field of Classification Search
None
See application file for complete search history.

(56) References Cited

U.S. PATENT DOCUMENTS

| | | | | |
|---|---|---|---|---|
| 6,589,442 | B1 * | 7/2003 | Wilson et al. | 252/70 |
| 7,842,382 | B2 * | 11/2010 | Helbing | 428/375 |
| 2009/0301972 | A1 * | 12/2009 | Hines et al. | 210/705 |

* cited by examiner

*Primary Examiner* — Necholus Ogden, Jr.
(74) *Attorney, Agent, or Firm* — Ram W. Sabnis

(57) ABSTRACT

Dedusting agents for fiberglass products and methods for making and using the same are provided. The composition can include a binder and a dedusting agent. The dedusting agent can include an emulsion comprising one or more pitches, one or more fatty acids, one or more rosins, or any combination thereof.

20 Claims, No Drawings

DEDUSTING AGENTS FOR FIBERGLASS PRODUCTS AND METHODS FOR MAKING AND USING SAME

CROSS-REFERENCE TO RELATED APPLICATIONS

This application is a continuation of U.S. patent application Ser. No. 12/875,064, filed Sep. 2, 2010, now U.S. Pat. No. 8,551,355, which claims priority to U.S. Provisional Patent Application Ser. No. 61/239,161, filed Sep. 2, 2009, and is a continuation-in-part of U.S. patent application Ser. No. 12/533,726, filed Jul. 31, 2009, now U.S. Pat. No. 8,133,408, which claims priority to U.S. Provisional Patent Application No. 61/085,840, filed Aug. 2, 2008, all of which are incorporated by reference herein.

BACKGROUND

1. Field

Embodiments described herein generally relate to dedusting agents for compositions. More particularly, such embodiments relate to dedusting agents for use in compositions for making fiberglass products.

2. Description of the Related Art

Fiber insulation, e.g. fiber batting, is well known in the construction industry and is generally installed in floors, ceilings, and walls. In addition to insulation in the form of batting, fiber insulation can be installed by blowing fiber insulation into an enclosed or open wall, ceiling, and/or floor space. When the fiber insulation is handled or installed, the fibers break causing fiber dust or particles to be suspended in the air. These suspended particles cause physical discomfort to persons handling the fiber insulation. For example, the suspended particles can cause difficulty in breathing, irritation of the eyes, and the like.

Binders are typically applied to the fiber insulation product in order to hold or contain the fibers together. The binders include dedusting agents that reduce the generation of dust when the fiber insulation products are installed or otherwise handled. Conventional dedusting agents, however, utilize petroleum based oils, such as mineral oil, that is emulsified in water using an emulsifier such as casein. These conventional dedusting agents are not bio-based, which for some applications can be preferable over petroleum based oils. Additionally, casein is a milk based emulsifier that has a very limited shelf life and as the product ages the casein causes the product to develop an undesirable odor.

There is a need, therefore, for new dedusting agents for use with binders for making fiberglass products.

SUMMARY

Dedusting agents for fiberglass products and methods for making and using the same are provided. In at least one specific embodiment, a composition can include a binder and a dedusting agent. The dedusting agent can include an emulsion comprising one or more pitches, one or more fatty acids, one or more rosins, or any combination thereof.

In at least one specific embodiment, a fiberglass product can include a plurality of fibers and a composition. The composition can include can include a binder and a dedusting agent. The dedusting agent can include an emulsion comprising one or more pitches, one or more fatty acids, one or more rosins, or any combination thereof. The composition can be at least partially cured.

In at least one specific embodiment, a process for preparing a fiberglass product can include contacting a plurality of fibers with a composition. The composition can include can include a binder and a dedusting agent. The dedusting agent can include an emulsion comprising one or more pitches, one or more fatty acids, one or more rosins, or any combination thereof. The process can also include collecting the contacted fibers to form a non-woven mat. The non-woven mat can be heated to at least partially cure the composition.

DETAILED DESCRIPTION

In one or more embodiments, a dedusting agent can be combined with a binder to provide a composition or "binder composition." The dedusting agent can include an emulsion comprising one or more pitches, one or more fatty acids, one or more rosins, or any combination thereof. It has been surprisingly and unexpectedly discovered that when the dedusting agents provided herein are combined with a binder, a composition is formed that can be applied to a fiberglass substrate that reduces the amount of dust that is generated from the substrate when manipulated, for example, during handling, relative to a composition not containing the dedusting agent.

Suitable pitches can include, bio-based or bio-derived pitches, petroleum based or petroleum derived pitches, or a combination thereof. Illustrative bio-based pitches can include, but are not limited to, tall oil pitch, natural resins such as shellac, gilsonite, copal, lignin, and wood tar, or any combination thereof. Illustrative petroleum based pitches can include, but are not limited to, coal tar pitch, asphalts such as bitumen, heavy crude oil, heavy petroleum distillates, tar-like, low volatility Fischer-Tropsch products, or any combination thereof.

Tall oil pitch is derived from crude tall oil (CTO). Crude tall oil is recovered as a byproduct in the Kraft pulping process in which wood is digested with alkali and sulfide, producing tall oil soap and crude sulfate turpentine as by-products. Acidification of the tall oil soap produces the crude tall oil. Prior to refining, crude tall oil can include a mixture of rosins or rosin acids, fatty acids, and neutral materials. As used herein, the term "neutral materials" refers to unsaponifiable material that typically includes sterols, higher-molecular weight alcohols and other alkyl chain materials. Crude tall oil is a known material of commerce. The CAS number for crude tall oil (CTO) is 8002-26-4.

Crude tall oil can have a fatty acids concentration ranging from a low of about 15 wt %, about 20 wt %, or about 25 wt % to a high of about 50 wt %, about 60 wt %, or about 70 wt %. Crude tall oil can have a rosin concentration ranging from a low of about 15 wt %, about 20 wt %, or about 25 wt % to a high of about 60 wt %, about 70 wt %, or about 75 wt %. Crude tall oil can have a neutral materials concentration ranging from a low of about 15 wt %, about 20 wt % or about 30 wt % to a high of about 35 wt %, about 40 wt %, or about 45 wt %. Illustrative fatty acids can include, but are not limited to, oleic acid, linoleic acid, conjugated linoleic acid, lauric acid, ricinoleic acid, stearic acid, palmitic acid, linolenic acid, palmitoleic acid, myristic acid, arachidic acid, behenic acid, and any combination thereof. Illustrative rosin acids or rosins can include abietic acid, dehydroabietic acid, isopimaric acid and pimaric acid.

Crude tall oil can have an acid value ranging from a low of about 100, about 110, or about 120 to a high of about 165, about 175, or about 180. The acid value can be determined by dissolving a known weight of the material into an organic solvent, e.g. toluene, and then titrating a measured amount of methanolic potassium hydroxide (KOH) solution into the material. The titration is complete when a pH of about 7 is obtained. The acid value of the material is equal to the amount of KOH, in mg, that was used in the titration, divided by the weight of the material, in grams, of the sample that was titrated. In other words, the acid value is equal to the milligrams of KOH needed to neutralize 1 gram of material.

Crude tall oil can have a specific gravity ranging from a low of about 0.9, about 0.95, or about 1 to a high of about 1.2, about 1.25, or about 1.3. Crude tall oil can have a saponification number ranging from a low of about 115, about 120, or about 125 to a high of about 175, about 180, or about 195. Crude tall oil can have an iodine number ranging from about 135, about 138, or about 140 to a high of about 148, about 150, or about 155. Crude tall oil can have a flash point ranging from a low of about 300° C., about 325° C., or about 350° C. to a high of about 375° C., about 400° C., or about 425° C.

The crude tall oil can be distilled to provide several different products in addition to tall oil pitch, which can include, but are not limited to, heads or lights, fatty acids or tall oil fatty acids (TOFA), distilled tall oil (DTO), and rosin acids or rosins (tall oil rosins). Tall oil pitch is a known material of commerce. The CAS number for tall oil pitch is 8016-81-7. In one or more embodiments, the tall oil pitch in the dedusting agent can be provided in the form of crude tall oil. In other words, crude tall oil can be used as the source of tall oil pitch.

The precise composition of tall oil pitch depends, at least in part, on the particular process by which the tall oil pitch is isolated and/or the particular source(s) of wood from which the crude tall oil is produced. At room temperature, tall oil pitch is a semi-solid, tar-like material. Tall oil pitch is a hydrophobic material. The tall oil pitch can include, but is not limited to, fatty acids, esters of fatty acids, rosin or rosin acids, esters of rosin acids, and neutral materials. The fatty acids, the rosin acids, or both can be chemically modified. For example, chemically modified rosins can retain some polar groups like carboxylic acid or a polar group that has been added like an amine (rosin amine), polyethylene glycol chain (as a non-ionic emulsifier) or additional acid functionality through a Diels Alder reaction with fumaric or maleic acid/anhydride. Accordingly, chemically modified rosins include disproportionated rosin acids, maleated rosin acids, diethylene tetramine amido amines of rosin acids, amine-modified rosin acids, rosin salts, rosin ethoxylates, phenolic modified rosins, dimerized rosins, rosin-formaldehyde adducts, hydrogenated rosin, or any combination thereof.

The tall oil pitch can have a concentration of fatty acids and esters of fatty acids ranging from a low of about 5 wt %, about 7 wt %, or about 9 wt % to a high of about 20 wt %, about 30 wt %, about 40 wt %, about 50 wt %, or about 55 wt %. The tall oil pitch can have a concentration of rosin acids and esters of rosin acids ranging from about 5 wt %, about 7 wt %, or about 9 wt % to a high of about 20 wt %, about 25 wt %, about 30 wt %, or about 35 wt %. The tall oil pitch can have a concentration of neutral materials ranging from a low of about 30 wt %, about 40 wt %, or about 50 wt % to a high of about 70 wt %, about 80 wt %, or about 90 wt %. Dimerized rosin and dimerized fatty acid also can also be found in tall oil pitch. The tall oil pitch can have a moisture or water content of less than about 1 wt %, less than about 0.5 wt %, less than about 0.1 wt %, or less than about 0.05 wt %.

The tall oil pitch can have an acid value ranging from a low of about 20, about 25, or about 30 to a high of about 40, about 45, or about 50. The tall oil pitch can have a viscosity (centipoise at 85° C.) ranging from a low of about 20 centipoise (cP), about 40 cP, or about 60 cP to a high of about 110 cP, about 130 cP, or about 150 cP. The tall oil pitch can have a density ranging from a low of about 900 g/L, about 910 g/L, or about 920 g/L to a high of about 940 g/L, about 950 g/L, or about 960 g/L. The tall oil pitch can have a softening temperature ranging from a low of about 15° C., about 20° C., or about 25° C. to a high of about 40° C., about 50° C., or about 60° C. The tall oil pitch can have an energy or heating value of about 10,000 BTU/lb, about 12,000 BTU/lb, about 14,000 BTU/lb, about 16,000 BTU/lb, about 18,000 BTU/lb, about 20,000 BTU/lb, about 22,000 BTU/lb, or about 25,000 BTU/lb.

Suitable tall oil pitches are commercially available from a variety of sources including Georgia-Pacific Chemicals LLC, e.g., XTOL® Tall Oil Pitch. Typical properties of XTOL® Tall Oil Pitch include a viscosity of about 450 cps at a temperature of 85° C., a concentration of rosin acids of about 9 wt %, a concentration of fatty acids of about 9 wt %, an acid value of 35 mg KOH/g, and an energy value of about 17,000 BTU/lb.

Another suitable pitch can include coal tar pitch, which is a byproduct of coke production and coal gasification. Coal tar pitch is a mixture containing polycyclic aromatic hydrocarbons and heterocyclic compounds. Another suitable pitch can include one or more asphalts (bitumens), which is a sticky, black, and highly viscous liquid or semi-solid that is present in most crude petroleums and in some natural deposits sometimes termed asphaltum. Asphalt (bitumen) pitch is also commercially available from a wide range of sources. Other suitable sources of pitch can include heavy crude oil, heavy petroleum distillates, and tar-like, low volatility Fischer-Tropsch products. As such, the pitch can be or include tall oil pitch, coal tar pitch, heavy crude oil, heavy petroleum distillates, Fischer-Tropsch products, asphalt (bitumen), or any combination thereof.

The fatty acids and rosin acids can be derived from any suitable source. For example, the fatty acids and rosins can be recovered as products from the distillation of crude tall oil. Suitable sources of fatty acids and/or rosins can include distilled tall oil (DTO), tall oil fatty acids (TOFA), rosin acids (tall oil rosins), or any combination thereof, derived from crude tall oil, such as by the distillation of crude tall oil. In another example, the fatty acids and/or rosins can be provided in the form of crude tall oil. In other words, the fatty acids and/or rosins can be used as present in crude tall oil. The fatty acids and/or rosins can also be or include crude tall oil and a combination of one or more products derived from crude tall oil.

Distilled tall oil (DTO) is an intermediate fraction that can be produced from the distillation of crude tall oil and includes a mixture of various components. For example, distilled tall oil can include a mixture of fatty acids, fatty acid esters, rosins, rosin esters, and minor or trace amounts of neutral materials. The distilled tall oil can have a fatty acids and esters of fatty acids concentration ranging from a low of about 55 wt %, about 60 wt %, or about 65 wt % to a high of about 85 wt %, about 90 wt %, or about 95 wt %. The distilled tall oil can have a rosin acids or rosins concentration ranging from a low of about 5 wt %, about 10 wt %, or about 15 wt % to a high of about 30 wt %, about 35 wt %, or about 40 wt %. The distilled tall oil can have a neutral materials concentration ranging from a low of about 0.1 wt %, about 1 wt %, or about 1.5 wt % to a high of about 2 wt %, about 3.5 wt %, or about 5 wt %.

The distilled tall oil can have an acid value ranging from a low of about 20, about 25, or about 30 to a high of about 40, about 45, or about 50. The distilled tall oil can have a viscosity (centipoise at 85° C.) ranging from a low of about 10 cP, about 20 cP, about 30 cP, or about 40 cP to a high of about 100 cP, about 120 cP, about 135 cP, or about 150 cP. The distilled tall oil can have a density ranging from a low of about 840 g/L, about 860 g/L, or about 880 g/L to a high of about 900 g/L, about 920 g/L, or about 935 g/L. The distilled tall oil can have a saponification number ranging from a low of about 180, about 185, or about 190 to a high of about 200, about 205, or about 210. The distilled tall oil can have an iodine value ranging from a low of about 115, about 117, or about 120 to a high of about 130, about 135, or about 140.

The rosin acids derived from crude tall oil (tall oil rosin) are also an intermediate fraction that can be produced from the distillation of crude tall oil. The tall oil rosin can have a concentration of rosin acids ranging from a low of about 80 wt %, about 85 wt %, or about 90 wt % to a high of about 93 wt %, about 95 wt %, or about 99 wt %. Illustrative rosin acids can include, but are not limited to, abietic acid, dehydroabietic acid, isopimaric acid and pimaric acid. For example, the tall oil rosin can have a concentration of abietic acid ranging from a low of about 35 wt %, about 40 wt %, or about 43 wt % to a high of about 50 wt %, about 55 wt %, or about 60 wt %. The tall oil rosin can have a concentration of dehydroabietic acid ranging from a low of about 10 wt %, about 13 wt %, or about 15 wt % to a high of about 20 wt %, about 23 wt %, or about 25 wt %. The tall oil rosin can have a concentration of isopimaric acid of about 10 wt % or less, about 8 wt % or less, about 5 wt % or less, or about 3 wt % or less. The tall oil rosin can have a concentration of pimaric acid of about 10 wt % or less, about 8 wt % or less, about 5 wt % or less, or about 3 wt % or less. The tall oil rosins can have a fatty acids concentration ranging from a low of about 0.5 wt %, about 1 wt %, or about 2 wt % to a high of about 3 wt %, about 5 wt %, or about 10 wt %. The tall oil rosin can have a concentration of neutral materials ranging from a low of about 0.5 wt %, about 1 wt %, or about 2 wt % to a high of about 3 wt %, about 5 wt %, or about 10 wt %. The tall oil rosin can have a density ranging from a low of about 960 g/L, about 970 g/L, or about 980 g/L to a high of about 1,000 g/L, about 1,010 g/L, or about 1,020 g/L. The tall oil rosin can have an acid value ranging from a low of about 150, about 160, or about 165 to a high of about 170, about 175, or about 180.

The tall oil fatty acids (TOFA) is also an intermediate fraction that can be produced from the distillation of crude tall oil and includes a mixture of various fatty acids, fatty acid esters, and minor amounts of rosin, rosin esters, and neutral materials. The tall oil fatty acids can have an oleic acid ranging from a low of about 30 wt %, about 35 wt %, or about 40 wt % to a high of about 45 wt %, about 50 wt %, or about 55 wt %. The tall oil fatty acids can have a linoleic acid concentration ranging from a low of about 30 wt %, about 35 wt %, or about 40 wt % to a high of about 45 wt %, about 50 wt %, or about 55 wt %. The tall oil fatty acids can have a concentration of stearic acid ranging from a low of about 0.5 wt %, about 1 wt %, or about 1.5 wt % to a high of about 2 wt %, about 3 wt %, or about 5 wt %. The tall oil fatty acids can have a concentration of conjugated linoleic acid ranging from a low of about 0.5 wt %, about 1 wt %, or about 1.5 wt % to a high of about 2 wt %, about 3 wt %, or about 5 wt %. The tall oil fatty acids can have a combined concentration of palmitic acid, linolenic acid, and palmitoleic acid ranging from a low of about 0.5 wt %, about 1 wt %, or about 1.5 wt % to a high of about 2 wt %, about 3 wt %, or about 5 wt %. The tall oil fatty acids can have a concentration of rosins of less than about 5 wt %, less than about 3 wt %, less than about 2 wt %, less than about 1 wt %, or less than about 0.5 wt %. The tall oil fatty acids can have a concentration of neutral materials of less than about 5 wt %, less than about 3 wt %, less than about 2 wt %, less than about 1 wt %, or less than about 0.5 wt %.

The tall oil fatty acids can have an acid value ranging from a low of about 180, about 190, or about 195 to a high of about 200, about 205, or about 210. The tall oil fatty acids can have a density ranging from a low of about 840 g/L, about 860 g/L, or about 880 g/L to a high of about 920 g/L, about 940 g/L, or about 960 g/L. The tall oil fatty acids can have a saponification number ranging from about 190 to about 210. The tall oil fatty acids can have an iodine value ranging from about 120 to about 135.

Suitable products derived from crude tall oil (CTO) are commercially available from a variety of sources including Georgia-Pacific Chemicals LLC. Representative distilled tall oil (DTO), tall oil fatty acids (TOFA), and/or tall oil rosin products can include, but are not limited to, XTOL® 100, XTOL® 101, XTOL® 300, XTOL® 304, XTOL® 520, XTOL® 530, XTOL® 540, XTOL® 542, XTOL® 656, XTOL® 690, XTOL® 692, XTOL® MTO, LYTOR® 100, LYTOR® 105, LYTOR® 105K, LYTOR® 110 and LYTOR® 307.

Processes for producing tall oil pitch, distilled tall oil, tall oil fatty acids, tall oil rosin acids, and other products derived from crude tall oil can be as discussed and described in U.S. Pat. Nos. 3,943,117; 4,075,188; 4,154,725; 4,238,304; 4,308, 200; 4,495,095; 4,524,024; 5,132,399; 5,164,480; and, 6,469, 125; and U.S. Patent Application Publication Nos. 2005/ 0268530; and 2010/0025625. It also is understood by those skilled in the art that because crude tall oil, and, as such, tall oil pitch, distilled tall oil, tall oil fatty acids, tall oil rosins, and other crude tall oil derived products are derived from natural sources, the compositions can vary among the various sources.

In preparing the emulsion that includes the one or more pitches, fatty acids, and/or rosins, one or more base compounds can be used. The one or more base compounds can be or include any alkaline material. An aqueous emulsion can be prepared by combining the one or more pitches, fatty acids, and/or rosins and the one or more base compounds. Illustrative base compounds can include, but are not limited to, hydroxides, carbonates, ammonia, amines, or any combination thereof. Illustrative hydroxides can include, but are not limited to, sodium hydroxide, potassium hydroxide, ammonium hydroxide (e.g., aqueous ammonia), lithium hydroxide, and cesium hydroxide. Illustrative carbonates can include, but are not limited to, sodium carbonate, potassium carbonate, and ammonium carbonate. Illustrative amines can include, but are not limited to, alkanolamines, polyamines, aromatic amines, and any combination thereof. Illustrative alkanolamines can include, but are not limited to, monoethanolamine (MEA), diethanolamine (DEA), triethanolamine (TEA), or any combination thereof. An alkanolamine is defined as a compound that has both amino and hydroxyl functional groups as illustrated by diethanolamine, triethanolamine, 2-(2-aminoethoxy)ethanol, aminoethyl ethanolamine, aminobutanol and other aminoalkanols. Illustrative aromatic amines can include, but are not limited to, benzyl amine, aniline, ortho toludine, meta toludine, para toludine, n-methyl aniline, N—N'-dimethyl aniline, di- and tri-phenyl amines, 1-naphthylamine, 2-naphthylamine, 4-aminophenol, 3-aminophenol and 2-aminophenol. Illustrative polyamines can include, but are not limited to, diethylenetriamine (DETA), triethylenetetramine (TETA), tetraethylenepentamine (TEPA). Other polyamines can include, for example, 1,3-propanediamine, 1,4-butanediamine, polyamidoamines, and polyethylenimines.

In one or more embodiments, the one or more emulsifiers or emulsifying agents that can be used to prepare the emulsion can include any emulsifier or combination of emulsifiers.

Different classes of emulsifiers can include cationic emulsifiers such as alkyltrimethylammonium salts, polyethoxylated tallow amines, anionic emulsifiers such as alkyl sulfates, alkyl benzene sulfonates, alkyl carboxylates, nonionic emulsifiers such as fatty alcohols, ethoxylated alkylphenols, and amphoteric emulsifiers such as amino acids, betaines, or any combination thereof.

In one or more embodiments, the emulsifier can be or include protein-based emulsifiers and/or other natural emulsifiers. Illustrative protein-based emulsifiers can include, but are not limited to, soy-protein based materials, gelatin, phospholipids such as lecithin and casein, and the like. Alkali salts, e.g., sodium and/or ammonium salts of casein, can also be used. An alkali caseinate can be pre-formed or it can be formed in situ when preparing the emulsion, for example by mixing casein with an alkali hydroxide during the preparation of the emulsion. Other natural emulsifiers can include, but are not limited to, Gum Arabic, Guar gum, and starches such as corn starch and potato starch.

Other emulsifiers can include nonylphenol ethoxylates of various ethoxylate chain lengths, alkyl succinate salts, resinous soaps and resinous emulsions such as fatty acid based materials and rosin acid based materials. A suitable nonylphenol ethyoxylate commercially available can be or include Tergitol NP-70 (available from Dow Chemical Company). Suitable emulsifiers can also include fatty acid based materials and rosin acid based materials derived from crude tall oil, distilled tall oil, tall oil fatty acids, chemically modified tall oil (including products identified as dimer acids, oxidized tall oil, maleated tall oil, oxidized and maleated tall oil and chemically-modified versions thereof), tall oil rosins, chemically modified tall oil rosins, or any combination thereof. Illustrative maleated, oxidized, maleated and oxidized, and/or derivatives thereof can include those compositions discussed and described in U.S. Patent Application Publication Nos. 2008/0179570, 2008/0194795, 2009/0065736, and 2009/0194731. In one or more embodiments, the emulsifier can be or include one or more Maillard reaction products. Illustrative Maillard reaction products can include, but are not limited to, an adduct of an amine reactant and a reducing sugar, a reducing sugar equivalent, or a mixture thereof. Suitable Maillard reaction products can be as discussed and described in U.S. Patent Application Publication No. 2009/0301972. In one or more embodiments, fatty acid based and/or rosin acid based emulsifiers can be partially neutralized.

Other fatty acids and chemically modified fatty acids can include straight-chain or branched, saturated, mono- or poly-unsaturated fatty acid radicals having 8 to 24 carbon atoms, in particular 12 to 22 carbon atoms, or any combination thereof. Representative fatty acids include oleic acid, lauric acid, linoleic acid, linolenic acid, palmitic acid, stearic acid, ricinoleic acid, myristic acid, arachidic acid, behenic acid and mixtures thereof.

Other fatty acids-based products suitable for use as the emulsifier can include fatty acids derived (saponified) from animal or plant derived oils and their derivatives. Through the use of known saponification techniques, a number of animal and/or vegetable oils (triglycerides), such as linseed (flaxseed) oil, castor oil, tung oil, soybean oil, cottonseed oil, olive oil, canola oil, corn oil, sunflower seed oil, peanut oil, coconut oil, safflower oil, palm oil, or any combination thereof, can be used as a source of fatty acid(s) for making an emulsifier.

In one or more embodiments, the amount of the emulsifier or the presence of an emulsifier can depend, at least in part, on the particular emulsifier and/or the particular components of the emulsion to be formed. For example, if the emulsion consists of tall oil pitch, an emulsifier is preferably used to produce the emulsion. In another example, if the emulsion includes crude tall oil, distilled tall oil, tall oil rosins, and/or tall oil fatty acids, an emulsifier can be present or absent in the emulsion. In other words, if crude tall oil and/or one or more products derived from crude tall oil are present in the emulsion, the fatty acids can act as emulsifiers. The suitability of any particular emulsifier and an appropriate quantity to use in the emulsification of a particular emulsion composition can be selected following routine testing.

In one or more embodiments, the concentration of pitch(es) in the emulsion can range from about 5 wt % to about 80 wt %, based on the combined weight of any pitch(es), fatty acid(s), rosin(s), base compound(s), and/or emulsifier(s) in the emulsion. For example, the concentration of the pitch(es) in the emulsion can range from a low of about 10 wt %, about 20 wt %, about 30 wt %, or about 35 wt % to a high of about 50 wt %, about 60 wt %, about 70 wt %, or about 75 wt %, based on the combined weight of any pitch(es), fatty acid(s), rosin(s), base compound(s), and/or emulsifier(s) in the emulsion.

In one or more embodiments, the concentration of fatty acid(s) in the emulsion can range from about 1 wt % to about 45 wt %, based on the combined weight of any pitch(es), fatty acid(s), rosin(s), base compound(s), and/or emulsifier(s) in the emulsion. For example, the concentration of the fatty acid(s) in the emulsion can range from a low of about 1 wt %, about 5 wt %, about 10 wt %, about 20 wt %, or about 25 wt % to a high of about 30 wt %, about 35 wt %, about 37 wt %, or about 40 wt %, based on the combined weight of any pitch(es), fatty acid(s), rosin(s), base compound(s), and/or emulsifier(s) in the emulsion.

In one or more embodiments, the concentration of rosin(s) in the emulsion can range from about 1 wt % to about 40 wt %, based on the combined weight of any pitch(es), fatty acid(s), rosin(s), base compound(s), and/or emulsifier(s) in the emulsion. For example, the concentration of the fatty acid(s) in the emulsion can range from a low of about 1 wt %, about 5 wt %, about 15 wt %, or about 20 wt % to a high of about 25 wt %, about 30 wt %, about 35 wt %, or about 40 wt, based on the combined weight of any pitch(es), fatty acid(s), rosin(s), base compound(s), and/or emulsifier(s) in the emulsion.

In one or more embodiments, the concentration of the base compound(s) in the emulsion can range from about 0.1 wt % to about 5 wt %, based on the combined weight of any pitch(es), fatty acid(s), rosin(s), base compound(s), and/or emulsifier(s) in the emulsion. For example, the concentration of the base compound(s) in the emulsion can range from a low of about 0.5 wt %, about 0.8 wt %, or about 1 wt % to a high of about 2 wt %, about 3 wt %, or about 4 wt %, based on the combined weight of any pitch(es), fatty acid(s), rosin(s), base compound(s), and/or emulsifier(s) in the emulsion.

The dedusting agent can also include one or more oils. The one or more oils can be petroleum based or petroleum derived oils, bio-based or bio-derived oils, synthetic-based or synthetically-derived oils, or any combination thereof. In one or more embodiments, the oil can be or include mineral oils, glycols such as ethylene glycol, motor oils, hydraulic oils, soybean oil, rapeseed oil, sunflower oil, corn oil, peanut oil, cotton oil, palm, oil, palm kernel oil, coconut oil, or any combination thereof. Suitable oils can include hydrocarbons that contain from about 10 carbon atoms to about 100 carbon atoms. For example, the number of carbon atoms in the oil can range from a low of about 10, about 15, about 20, about 25 or about 30 to a high of about 40, about 60, about 70, about 80, about 90, or about 100. Motor oils can include those oils conventionally or typically used to lubricate moving components in internal combustion engines, for example.

The one or more oils can have any number of desired properties or combination of properties. For example, the one or more oils can have flash point of greater than about 200° C., greater than about 250° C., greater than about 300° C., greater than about 350° C., greater than about 400° C., greater than about 450° C., greater than about 500° C., greater than about 550° C., or greater than about 600° C. In another example, the one or more oils can have a flash point between about 275° C. and about 600° C., between about 300° C. and about 550° C., between about 350° C. and about 500° C., or between about 400° C. and about 600° C. In one or more embodiments, the flash point of the oil can be greater than a temperature the composition can be subjected to when used to produce a fiberglass product. In another example, the one or more oils can have a flash point ranging from a low of about 200° C., about 225° C., about 250° C., about 275° C., or about 300° C. to a high of about 350° C., about 375° C., about 400° C., about 425° C., about 450° C., about 475° C., about 500° C., about 525° C., or about 550° C.

Considering mineral oil in more detail, the mineral oil can include from about 15 to about 40 carbon atoms. The mineral oil can include paraffinic hydrocarbons, naphthenic hydrocarbons, aromatic hydrocarbons, or any combination thereof. Mineral oil can also be referred to as "brightstock."

In one or more embodiments, the amount of oil(s) relative to the emulsion can vary between wide limits. For example, for a dedusting agent that includes an emulsion containing one or more pitches, the dedusting agent can have a concentration of the oil(s) ranging from a low of about 1 wt %, about 5 wt %, or about 10 wt % to a high of about 30 wt %, about 40 wt %, or about 50 wt % based on the weight of the one or more pitches. In another example, for a dedusting agent that includes an emulsion containing one or more pitches, the dedusting agent can have a concentration of the oil(s) ranging from about 1 wt % to about 50 wt %, from about 5 wt % to about 25 wt %, from about 5 wt % to about 20 wt %, or from about 1 wt % to about 25 wt %, based on the weight of the one or more pitches.

In one or more embodiments, for a dedusting agent that includes an emulsion containing one or more pitches and one or more fatty acids and one or more rosins, the dedusting agent can have a concentration of the oil(s) ranging from a low of about 1 wt %, about 5 wt %, or about 10 wt %, or about 20 wt % to a high of about 50 wt %, about 60 wt %, about 70 wt %, about 80 wt %, about 90 wt %, or about 100 wt %, based on the combined weight of the pitches, fatty acids, and rosins. In one or more embodiments, an emulsion containing the one or more pitches and one or more fatty acids and/or one or more rosins, the dedusting agent can have a concentration of the oil(s) ranging from a low a low of about 1 wt %, about 5 wt %, or about 10 wt %, or about 20 wt % to a high of about 50 wt %, about 60 wt %, about 70 wt %, about 80 wt %, about 90 wt %, or about 100 wt %, based on the combined weight of the pitches, fatty acids, and rosins.

The dedusting agent can also include one or more film forming polymers. The film forming polymer can include any film forming polymer or combination of film forming polymers. Preferably the film forming polymer(s) does not interfere with the stability of the emulsion that includes one or more pitches, fatty acids, rosin acids, or any combination thereof. Suitable film forming polymers can be identified using only routine testing. The film forming polymer(s) can be water soluble. The film forming polymers can be capable of forming a latex.

Suitable film forming polymers can include, but are not limited to, copolymers of styrene and acrylic acid; copolymers of styrene-acrylate; copolymers of styrene and maleic anhydride; copolymers of styrene and maleic acid; copolymers of styrene butadiene; copolymers of styrene isoprene; polyolefins; polyacrylates and other acrylate copolymers; polystyrene; polystyrene copolymers; polyurethanes; polyamides; polyesters including alkyd resins; modified rosin salts; polycarbonates; polyacrylamides; vinyl chloride and/or vinylidene chloride homopolymers and copolymers; polyterpenes; resins based on aldehydes (formaldehyde) with phenolics, melamine, and/or urea; polyimides; polysiloxanes; polyvinylpyrolidone; aliphatic hydrocarbon resins; aromatic hydrocarbon resins; polyvinyl alcohol; polyethylene glycol; polyethylene imines; polyethylene oxides; lignosulfonates; water soluble gums; water soluble starches; microcrystalline waxes; petroleum; hydroxymethyl cellulose; carboxymethylcellulose; rubber and modified rubber latexes; humates; tallow; shellac and gilsonite. The film forming polymers can be derived from natural sources. The film forming polymers can be synthetically produced. As used herein, the terms "acrylic" and "acrylate" are also intended to include alkylacrylics and alkylacrylates, such as methacrylic and methacrylate.

In one or more embodiments, the film forming polymer can include functional groups or segments capable of interacting both with an aqueous phase and with the pitch. As such, in one or more embodiments the film forming polymer can include both hydrophilic and hydrophobic groups or segments. For interacting with an aqueous phase, the film forming polymer can include hydrophilic groups such as carboxyl or hydroxyl groups. For interacting with the pitch, the film forming polymer can include groups or segments that are hydrophobic, such as hydrocarbon groups. Illustrative hydrophilic groups or segments can include, but are not limited to, polymerized maleic anhydride (maleic acid), acrylic acid, methacrylic acid, hydroxyethylacrylic acid, hydroxyethylmethacrylic acid, hydroxymethylacrylate, hydroxyethylacrylate, hydroxyethyl methacrylate, ethylene oxide, hydrolyzed vinylacetate, or any combination thereof. Illustrative hydrophobic groups or segments can include, but are not limited to, polymerized ethylene, propylene, butylene, styrene, halogenated olefins such as tetrafluoroethylene, chlorotrifluoroethylene, acrylates of alcohols having about 1-20 carbon atoms, or any combination thereof. Methods for making such film forming polymers are well known and such materials are widely available commercially.

In one or more embodiments, suitable film forming polymers can have a sufficiently high molecular weight so that at their level of use they can form, in cooperation with the pitch (if present), a film having both a reduced tack and a sufficient integrity to reduce the generation of fugitive dust on the surface of the solids to which the dedusting composition has been applied. In one or more embodiments, the molecular weight of the film forming polymer can range from a low of about 1,000, about 5,000, about 10,000, about 15,000, or about 20,000 to a high of about 100,000, about 200,000, about 300,000, about 400,000, or about 500,000. In one or more embodiments, the molecular weight of the film forming polymer can range from about 10,000 to about 300,000, from about 10,000 to about 200,000, or from about 10,000 to about 180,000.

In at least one specific embodiment, the film forming polymer can be or include styrene maleic anhydride (acid) (SMA). The molecular weight of the SMA copolymer can vary within wide limits. The SMA copolymer can have a weight average molecular weight (Mw) of between about 1,000 and about 500,000. For example, the SMA copolymer can have a Mw ranging from a low of about 1,000, about 5,000, about 10,000, about 15,000, or about 20,000 to a high of about 100,000, about 200,000, about 300,000, about 400,000, or about 500,000. In another example, the Mw of the SMA copolymer can range from a low of about 1,000, about 5,000, or about 10,000 to a high of about 400,000, or about 350,000, or about 300,000, or about 250,000, or about 200,000, or about 175,000, or about 150,000, or about 120,000, or about 100,000, or about 90,000, or about 80,000, or about 70,000, or about 60,000, or about 50,000, or about 40,000, or about 30,000, or about 20,000.

In one or more embodiments, the amount of film forming polymer(s) relative to the emulsion can vary between wide limits. The film forming polymer can be present in the dedusting composition in an amount sufficient to reduce the tack of the emulsion and/or an at least partially dried emulsion. For example, for a dedusting agent that includes an emulsion containing one or more pitches, the dedusting agent can have a concentration of the film forming polymer(s) ranging from a low of about 1 wt %, about 5 wt %, or about 10 wt % to a high of about 30 wt %, about 40 wt %, or about 50 wt % based on the weight of the one or more pitches. In another example, for a dedusting agent that includes an aqueous emulsion containing one or more pitches, the dedusting composition can have a concentration of the film forming polymer(s) ranging from a low of about 1 wt %, about 5 wt %, or about 10 wt % to a high of about 30 wt %, about 40 wt %, or about 50 wt % based on the weight of the one or more pitches. In another example, for a agent composition that includes an aqueous emulsion containing one or more pitches, the dedusting composition can have a concentration of the film forming polymer(s) ranging from about 1 wt % to about 50 wt %, from about 5 wt % to about 25 wt %, from about 5 wt % to about 20 wt %, or from about 1 wt % to about 25 wt %, based on the weight of the one or more pitches.

The dedusting agent can have any desired concentration of solids. The solids can be or include the one or more pitches, fatty acids, rosins, and/or emulsifier. For example, the dedusting agent can have a solids concentration ranging from a low of about 10 wt %, about 20 wt %, about 30 wt %, or about 40 wt % to a high of about 50 wt %, about 55 wt %, or about 60 wt %, based on the weight of the dedusting agent. In another example, the dedusting agent can have a solids concentration of about 35 wt % to about 50 wt %, about 40 wt % to about 50 wt %, or about 35 wt % to about 45 wt %, based on the weight of the dedusting agent. In another example, the dedusting agent can have a solids concentration of about 37 wt % to about 43 wt %, from about 47 wt % to about 53 wt %, or from about 37 wt % to about 53 wt %, based on the weight of the dedusting agent. The dedusting composition can have a water concentration ranging from a low of about 10 wt %, about 20 wt %, about 20 wt %, or about 50 wt % to a high of about 60 wt %, about 70 wt %, or about 80 wt %, based on the weight of the dedusting agent.

The solids in the dedusting agent can have any desired size. For example, the solids in the dedusting agent can have an average size ranging from about 0.1 µm to about 20 µm. In another example, the size of the solids in the dedusting agent can be less than about 10 µm, less than about 8 µm, less than about 5 µm, less than about 4 µm, less than about 3 µm, less than about 2 µm, less than about 1 µm, or less than about 0.5 µm. In another example, the size of the solids in the dedusting agent can range from about 0.5 µm to about 3.5 µm, from about 1 µm to about 3 µm, or from about 0.5 µm to about 3 µm.

Returning to the composition, the dedusting agent can be mixed, blended, or otherwise combined with one or more binders to produce the composition. Illustrative binders can include, but are not limited to aldehyde containing or aldehyde based polymers, a mixture of Maillard reactants, a copolymer of one or more vinyl aromatic derived units and at least one of maleic anhydride and maleic acid, or any combination thereof.

Illustrative aldehyde containing or aldehyde based polymers can include, but are not limited to, urea-aldehyde polymers, melamine-aldehyde polymers, phenol-aldehyde polymers, or combinations thereof. Combinations of aldehyde based polymers can include, for example, melamine-urea-aldehyde, phenol-urea-aldehyde, and phenol-melamine-aldehyde.

The aldehyde component of the aldehyde-containing polymers, e.g., urea-aldehyde polymers, melamine-aldehyde polymers, and/or phenol-aldehyde polymers can include any suitable aldehyde. The aldehyde component can include a variety of substituted and unsubstituted aldehyde compounds. Illustrative aldehyde compounds can include the so-called masked aldehydes or aldehyde equivalents, such as acetals or hemiacetals. Specific examples of suitable aldehyde compounds can include, but are not limited to, formaldehyde, acetaldehyde, propionaldehyde, butyraldehyde, furfuraldehyde, benzaldehyde, or any combination thereof. As used herein, the term "formaldehyde" can refer to formaldehyde, formaldehyde derivatives, other aldehydes, or combinations thereof. Preferably, the aldehyde component is formaldehyde.

Formaldehyde for making suitable formaldehyde containing polymers is available in many forms. Paraform (solid, polymerized formaldehyde) and formalin solutions (aqueous solutions of formaldehyde, sometimes with methanol, in 37%, 44%, or 50% formaldehyde concentrations) are commonly used forms. Formaldehyde gas is also available. Any of these forms is suitable for use in preparing a formaldehyde containing polymer.

The urea component of a urea-aldehyde polymer can be provided in many forms. For example, solid urea, such as prill, and/or urea solutions, typically aqueous solutions, are commonly available. Further, the can may be combined with another moiety, for example, formaldehyde and/or urea-formaldehyde adducts, often in aqueous solution. Any form of urea or urea in combination with formaldehyde (or any other aldehyde or combinations thereof) can be used to make a urea-aldehyde polymer. For example, both urea prill and combined urea-formaldehyde products can be used. Suitable urea-formaldehyde polymers can be prepared from urea and formaldehyde monomers or from urea-formaldehyde precondensates in manners well known to those skilled in the art. Illustrative urea-formaldehyde products can include, but are not limited to, Urea-Formaldehyde Concentrate (UFC). These types of products can be as discussed and described in U.S. Pat. Nos. 5,362,842 and 5,389,716, for example. Any of these forms of urea, alone or in any combination, can be used to prepare a urea-aldehyde polymer.

Urea-formaldehyde polymers can include from about 45% to about 70%, and preferably, from about 55% to about 65% non-volatiles, generally have a viscosity of about 50 cps to about 600 cps, preferably about 150 to about 400 cps, normally exhibit a pH of about 7 to about 9, preferably about 7.5 to about 8.5, and often have a free formaldehyde level of not more than about 3.0%, and a water dilutability of about 1:1 to about 100:1, preferably about 5:1 and above. Many suitable urea-formaldehyde polymers are commercially available. Urea-formaldehyde polymers such as the types sold by Georgia Pacific Resins, Inc. (e.g., GP-2928 and GP-2980) for glass fiber mat applications, those sold by Hexion Specialty Chemicals, and by Arclin Company can be used.

In preparing a urea-aldehyde polymer, the aldehyde and the urea component can be reacted in an aqueous mixture under alkaline conditions using known techniques and equipment. For example, a urea-formaldehyde polymer can be made using a molar excess of formaldehyde (along with any other reactive aldehyde component(s)) relative to the urea component. The molar ratio of formaldehyde to urea (F:U) in the urea-formaldehyde polymer can range from about 1.1:1 to about 6:1, from about 1.3 to about 5:1, or from about 1.5:1 to about 4:1. When synthesized, such polymers typically contain a low level of residual "free" urea component and a much larger amount of residual "free" formaldehyde i.e. unreacted formaldehyde. Prior to any formaldehyde scavenging, the urea-formaldehyde polymer can be characterized by a free formaldehyde content ranging from about 0.2 wt % to about 18 wt % of the aqueous urea-formaldehyde resin.

The phenol component of a phenol-aldehyde polymer can include a variety of substituted phenolic compounds, unsubstituted phenolic compounds, or any combination of substituted and/or unsubstituted phenolic compounds. For example, the phenol component can be phenol itself (i.e. mono-hydroxy benzene). Examples of substituted phenols can include, but are not limited to, alkyl-substituted phenols such as the cresols and xylenols; cycloalkyl-substituted phenols such as cyclohexyl phenol; alkenyl-substituted phenols; aryl-substituted phenols such as p-phenyl phenol; alkoxy-substituted phenols such as 3,5-dimethyoxyphenol; aryloxy phenols such as p-phenoxy phenol; and halogen-substituted phenols such as p-chlorophenol. Dihydric phenols such as catechol, resorcinol, hydroquinone, bis-phenol A and bis-phenol F also can also be used.

Specific examples of suitable phenolic compounds (phenol components) for replacing a portion or all of the phenol used in preparing a phenol-aldehyde polymer can include, but are not limited to, bis-phenol A, bis-phenol F, o-cresol, m-cresol, p-cresol, 3,5-5 xylenol, 3,4-xylenol, 3,4,5-trimethylphenol, 3-ethyl phenol, 3,5-diethyl phenol, p-butyl phenol, 3,5-dibutyl phenol, p-amyl phenol, p-cyclohexyl phenol, p-octyl phenol, 3,5 dicyclohexyl phenol, p-phenyl phenol, p-phenol, 3,5-dimethoxy phenol, 3,4,5 trimethoxy phenol, p-ethoxy phenol, p-butoxy phenol, 3-methyl-4-methoxy phenol, p-phenoxy phenol, naphthol, anthranol and substituted derivatives thereof. Preferably, about 80 wt % or more, about 90 wt % or more, or about 95 wt % or more of the phenol component comprises phenol (monohydroxybenzene).

In preparing a phenol-aldehyde polymer, the aldehyde component and the phenol component can be reacted in an aqueous mixture under alkaline conditions using known techniques and equipment. For example, a phenol-formaldehyde polymer can be made using a molar excess of formaldehyde (along with any other reactive aldehyde component(s)) relative to the phenol component, e.g., phenol. The molar ratio of formaldehyde to phenol (F:P) in the phenol-formaldehyde polymer can range from about 1.1:1 to about 6:1, from about 1.3 to about 5:1, or from about 1.5:1 to about 4:1. When synthesized, such polymers typically contain a low level of residual "free" phenol component and a much larger amount of residual "free," i.e. unreacted formaldehyde. Prior to any formaldehyde scavenging, the phenol-formaldehyde polymer can be characterized by a free formaldehyde content ranging from about 0.2 wt % to about 18 wt % of the aqueous phenol-formaldehyde polymer.

Suitable phenol-formaldehyde polymers can be as discussed and described in U.S. Patent Application Publication Nos. 2008/0064799 and 2008/0064284. In these published patent applications, the formation of tetradimer is suppressed by the addition of a sulfite source during the preparation of the phenol-formaldehyde polymer. Other phenol-formaldehyde resins can be prepared under acidic reaction conditions, such as novolac resins and inverted novolac resins. Suitable novolac resins and inverted novolac resins can be as discussed and described in U.S. Pat. Nos. 5,670,571 and 6,906,130 and U.S. Patent Application Publication No. 2008/0280787.

The melamine component of a melamine-aldehyde polymer can be provided in many forms. For example, solid melamine, such as prill, and/or melamine solutions can be used. Although melamine is specifically mentioned, the melamine can be totally or partially replaced with other aminotriazine compounds. Other suitable aminotriazine compounds can include substituted melamines, or cycloaliphatic guanamines, or mixtures thereof. Substituted melamines include the alkyl melamines and aryl melamines which can be mono-, di-, or tri-substituted. In the alkyl substituted melamines, each alkyl group can contain 1-6 carbon atoms and, preferably 1-4 carbon atoms. Typical examples of some of the alkyl-substituted melamines are monomethyl melamine, dimethyl melamine, trimethyl melamine, monoethyl melamine, and 1-methyl-3-propyl-5-butyl melamine. In the aryl-substituted melamines, each aryl group can contain 1-2 phenyl radicals and, preferably, 1 phenyl radical. Typical examples of aryl-substituted melamines include monophenyl melamine and diphenyl melamines.

In preparing a melamine-aldehyde polymer, the aldehyde and the melamine component can be reacted in an aqueous mixture under alkaline conditions using known techniques and equipment. For example, a melamine-formaldehyde polymer can be made using a molar excess of formaldehyde (along with any other reactive aldehyde component(s)) relative to the melamine component, e.g., melamine. The molar ratio of formaldehyde to melamine (F:M) in the melamine-formaldehyde polymer can range from about 1.1:1 to about 6:1, from about 1.3 to about 5:1, or from about 1.5:1 to about 4:1. When synthesized, such polymers typically contain a low level of residual "free" melamine component and a much larger amount of residual "free," i.e. unreacted formaldehyde. Prior to any formaldehyde scavenging, the melamine-formaldehyde polymer can be characterized by a free formaldehyde content ranging from about 0.2 wt % to about 18 wt % of the aqueous melamine-formaldehyde resin.

Similar to urea-formaldehyde polymers, melamine-formaldehyde and phenol-formaldehyde polymers can be prepared from melamine or phenol monomers and formaldehyde monomers or from melamine-formaldehyde or phenol-formaldehyde precondensates. Phenol and melamine reactants, like the urea and formaldehyde reactants are commercially available in many forms and any form that can react with the other reactants and does not introduce extraneous moieties deleterious to the desired reaction and reaction product can be used in the preparation of the polymers.

Suitable phenol-formaldehyde resins and melamine-formaldehyde resins can include those sold by Georgia Pacific Resins, Inc. (e.g. GP-2894 and GP-4878, respectively). These polymers are prepared in accordance with well known methods and contain reactive methylol groups which upon curing form methylene or ether linkages. Such methylol-containing adducts may include N,N'-dimethylol, dihydroxymethylolethylene; N,N' bis(methoxymethyl), N,N'-dimethylolpropylene; 5,5-dimethyl-N,N' dimethylolethylene; N,N'-dimethylolethylene; and the like.

If urea is added to the aldehyde-containing polymer(s), any form or combination of forms of urea can be used. For example, an aqueous urea solution containing about 40 wt % urea can be added to the aldehyde-containing polymer(s) to form the premix. The premix can have a ratio of urea to the aldehyde-containing polymer(s) ranging from a low of about 1:10, about 1:8, or about 1:6 to a high of about 1:4, about 1:3, or about 1:2.

The mixture of Maillard reactants can include, but is not limited to, a source of a carbohydrate (carbohydrate reactant) and an amine reactant capable of participating in a Maillard reaction with the carbohydrate reactant. In another example, the mixture of Maillard reactants can include a partially pre-reacted mixture of the carbohydrate reactant and the amine reactant. The extent of any pre-reaction can preserve the ability of the mixture of Maillard reactants to be blended with the dedusting agent and with any other components desired to be added into composition.

The source of the carbohydrate can include one or more reactants having one or more reducing sugars, one or more reactants that yields one or more reducing sugars under thermal curing conditions, or a combination thereof. A reducing sugar can be a sugar that contains aldehyde groups, or can isomerize, i.e. tautomerize, to contain aldehyde groups. Such aldehyde groups are reactive with an amino group (amine reactant) under Maillard reaction conditions. Usually such aldehyde groups can also be oxidized with, for example, $Cu^{+2}$ to afford carboxylic acids. The carbohydrate reactant can optionally be substituted with other functional groups, such as with hydroxy, halo, alkyl, alkoxy, and the like. The carbohydrate source can also possess one or more chiral centers. The carbohydrate source can also include each possible optical isomer at each chiral center. Various mixtures, including racemic mixtures, or other diastereomeric mixtures of the various optical isomers of any such carbohydrate source, as well as various geometric isomers thereof, can be used.

The carbohydrate source can be nonvolatile. Nonvolatile carbohydrate sources can increase or maximize the ability of the carbohydrate reactant to remain available for reaction with the amine reactant under Maillard reaction conditions, including the curing conditions for curing the composition. Partially pre-reacting the mixture of the source of the carbohydrate and the amine reactant can expand the list of suitable carbohydrate sources. The carbohydrate source can be a monosaccharide in its aldose or ketose form, including a triose, a tetrose, a pentose, a hexose, or a heptose; or a polysaccharide, or any combination thereof.

If a triose serves as the carbohydrate source, or is used in combination with other reducing sugars and/or a polysaccharide, an aldotriose sugar or a ketotriose sugar can be utilized, such as glyceraldehyde and dihydroxyacetone, respectively. If a tetrose serves as the carbohydrate source, or is used in combination with other reducing sugars and/or a polysaccharide, aldotetrose sugars, such as erythrose and threose; and ketotetrose sugars, such as erythrulose, can be utilized. If a pentose serves as the carbohydrate source, or is used in combination with other reducing sugars and/or a polysaccharide, aldopentose sugars, such as ribose, arabinose, xylose, and lyxose; and ketopentose sugars, such as ribulose, arabulose, xylulose, and lyxulose, can be utilized. If a hexose serves as the carbohydrate source, or is used in combination with other reducing sugars and/or a polysaccharide, aldohexose sugars, such as glucose (i.e., dextrose), mannose, galactose, allose, altrose, talose, gulose, and idose; and ketohexose sugars, such as fructose, psicose, sorbose and tagatose, can be utilized. If a heptose serves as the carbohydrate source, or is used in combination with other reducing sugars and/or a polysaccharide, a ketoheptose sugar such as sedoheptulose can be utilized. Other stereoisomers of such carbohydrate sources not known to occur naturally are also contemplated to be useful in preparing the compositions. If a polysaccharide serves as the carbohydrate source, or is used in combination with monosaccharides, then sucrose, lactose, maltose, starch, and cellulose can be utilized.

The carbohydrate reactant can also be used in combination with a non-carbohydrate polyhydroxy reactant. Examples of non-carbohydrate polyhydroxy reactants can include, but are not limited to, trimethylolpropane, glycerol, pentaerythritol, polyvinyl alcohol, partially hydrolyzed polyvinyl acetate, fully hydrolyzed polyvinyl acetate, and mixtures thereof. The non-carbohydrate polyhydroxy reactant can be sufficiently nonvolatile to maximize its ability to remain available for reaction with other components during curing. Partially pre-reacting the mixture of the source of the carbohydrate (carbohydrate reactant) and the amine reactant can expand the list of suitable non-carbohydrate polyhydroxy reactants. The hydrophobicity of the non-carbohydrate polyhydroxy reactant can be a factor in determining the physical properties of the composition.

The amine reactant capable of participating in a Maillard reaction with the source of the carbohydrate can be a compound possessing an amino group. The compound can be present in the form of an amino acid. The free amino group can also be derived from a protein where the free amino groups are available in the form of, for example, the ε-amino group of lysine residues, and/or the α-amino group of the terminal amino acid. The amine reactant can also be formed separately or in situ by using a polycarboxylic acid ammonium salt reactant. Ammonium salts of polycarboxylic acids can be generated by neutralizing the acid groups of a polycarboxylic acid with an amine base, thereby producing polycarboxylic acid ammonium salt groups. Complete neutralization, i.e. about 100%, calculated on an equivalents basis, can eliminate any need to titrate or partially neutralize acid groups in the polycarboxylic acid(s) prior to binder formation. However, it is expected that less-than-complete neutralization also would not inhibit formation of the composition. To reiterate, neutralization of the acid groups of the polycarboxylic acid(s) can be carried out either before or after the polycarboxylic acid(s) is mixed with the carbohydrate(s).

Suitable polycarboxylic acids can include dicarboxylic acids, tricarboxylic acids, tetracarboxylic acids, pentacarboxylic acids, and the like, monomeric polycarboxylic acids, anhydrides, and any combination thereof, as well as polymeric polycarboxylic acids, anhydrides, and any combination thereof. Preferably, the polycarboxylic acid ammonium salt reactant is sufficiently non-volatile to maximize its ability to remain available for reaction with the carbohydrate reactant of a Maillard reaction. Again, partially pre-reacting the mixture of the source of the carbohydrate and the amine reactant can expand the list of suitable amine reactants, including polycarboxylic acid ammonium salt reactants. In another example, polycarboxylic acid ammonium salt reactants can be substituted with other chemical functional groups.

Illustrative monomeric polycarboxylic acids can include, but are not limited to, unsaturated aliphatic dicarboxylic acids, saturated aliphatic dicarboxylic acids, aromatic dicarboxylic acids, unsaturated cyclic dicarboxylic acids, saturated cyclic dicarboxylic acids, hydroxy-substituted derivatives thereof, and the like. Other suitable polycarboxylic acids can include unsaturated aliphatic tricarboxylic acids, saturated aliphatic tricarboxylic acids such as citric acid, aromatic tricarboxylic acids, unsaturated cyclic tricarboxylic acids, saturated cyclic tricarboxylic acids, hydroxy-substituted derivatives thereof, and the like. It is appreciated that any such polycarboxylic acids can be optionally substituted, such as with hydroxy, halo, alkyl, alkoxy, and the like. Other suitable polycarboxylic acids can include, but are not limited to, aconitic acid, adipic acid, azelaic acid, butane tetracarboxylic acid dihydride, butane tricarboxylic acid, chlorendic acid, citraconic acid, dicyclopentadiene-maleic acid adducts, diethylenetriamine pentaacetic acid, adducts of dipentene and maleic acid, ethylenediamine tetraacetic acid (EDTA), fully maleated rosin, maleated tall-oil fatty acids, fumaric acid, glutaric acid, isophthalic acid, itaconic acid, maleated rosin oxidized with potassium peroxide to alcohol then carboxylic acid, maleic acid, malic acid, mesaconic acid, biphenol A or bisphenol F reacted via the Kolbe-Schmidt reaction with carbon dioxide to introduce 3-4 carboxyl groups, oxalic acid, phthalic acid, sebacic acid, succinic acid, tartaric acid, terephthalic acid, tetrabromophthalic acid, tetrachlorophthalic acid, tetrahydrophthalic acid, trimellitic acid, trimesic acid, and the like, and anhydrides, and any combination thereof.

Suitable polymeric polycarboxylic acids can include organic polymers or oligomers containing more than one pendant carboxy group. The polymeric polycarboxylic acid can be a homopolymer or copolymer prepared from unsaturated carboxylic acids that can include, but are not limited to, acrylic acid, methacrylic acid, crotonic acid, isocrotonic acid, maleic acid, cinnamic acid, 2-methylmaleic acid, itaconic acid, 2-methylitaconic acid, $\alpha,\beta$-methyleneglutaric acid, and the like. The polymeric polycarboxylic acid can also be prepared from unsaturated anhydrides. Unsaturated anhydrides can include, but are not limited to, maleic anhydride, itaconic anhydride, acrylic anhydride, methacrylic anhydride, and the like, as well as mixtures thereof. Methods for polymerizing these acids and anhydrides are well-known in the chemical art.

Preferred polymeric polycarboxylic acids can include polyacrylic acid, polymethacrylic acid, polymaleic acid, and the like. Examples of commercially available polyacrylic acids include AQUASET® 529 (Rohm & Haas, Philadelphia, Pa., USA), CRITERION® 2000 (Kemira, Helsinki, Finland, Europe), NF1 (H. B. Fuller, St. Paul, Minn., USA), and SOKALAN® (BASF, Ludwigshafen, Germany, Europe). With respect to SOKALAN®, this is believed to be a water-soluble polyacrylic copolymer of acrylic acid and maleic acid, having a molecular weight of approximately 4,000. AQUASET® 529 is understood to be a composition containing polyacrylic acid cross-linked with glycerol, also containing sodium hypophosphite as a catalyst. CRITERION® 2000 is thought to be an acidic solution of a partial salt of polyacrylic acid, having a molecular weight of approximately 2,000. NF1 is believed to be a copolymer containing carboxylic acid functionality and hydroxy functionality, as well as units with neither functionality; NF1 is also thought to contain chain transfer agents, such as sodium hypophosphite or organophosphate catalysts.

The amine base for reaction with the polycarboxylic acid can include, but is not limited to, ammonia, a primary amine, i.e., $NH_2R^1$, and a secondary amine, i.e., $NHR^1R^2$, where $R^1$ and $R^2$ are each independently selected from the group consisting of: an alkyl, a cycloalkyl, an alkenyl, a cycloalkenyl, a heterocyclyl, an aryl, and a heteroaryl group. The amine base can be volatile or substantially non-volatile under conditions sufficient to promote reaction among the mixture of Maillard reactants during any partial pre-reaction or during thermal cure of the composition. Suitable amine bases can include, but are not limited to, a substantially volatile base, a substantially non-volatile base, or a combination thereof. Illustrative substantially volatile bases can include, but are not limited to, ammonia, ethylamine, diethylamine, dimethylamine, ethylpropylamine, or any combination thereof. Illustrative substantially non-volatile bases can include, but are not limited to, aniline, 1-naphthylamine, 2-naphthylamine, para-aminophenol, or any combination thereof.

One particular example of the mixture of Maillard reactants can include a mixture of aqueous ammonia, citric acid, and dextrose (glucose). It is believed that the mixture of aqueous ammonia, citric acid, and dextrose is representative of Knauf Insulation's ECOSE® Technology. In this mixture, the ratio of the number of molar equivalents of acid salt groups present on the polycarboxylic, citric acid reactant (produced upon neutralization of the —COOH groups of the citric acid by ammonia) to the number of molar equivalents of hydroxyl groups present on the carbohydrate reactant(s) can range from about 0.04:1 to about 0.15:1. After curing, this formulation results in a water-resistant, cured thermoset binder. Thus, in one embodiment, the number of molar equivalents of hydroxyl groups present on the dextrose, carbohydrate reactant can be about twenty five-fold greater than the number of molar equivalents of acid salt groups present on the polycarboxylic, citric acid reactant. In another embodiment, the number of molar equivalents of hydroxyl groups present on the dextrose carbohydrate reactant is about ten-fold greater than the number of molar equivalents of acid salt groups present on the polycarboxylic citric acid reactant. In yet another embodiment, the number of molar equivalents of hydroxyl groups present on the dextrose carbohydrate reactant is about six-fold greater than the number of molar equivalents of acid salt groups present on the polycarboxylic citric acid reactant.

As noted above, the mixture of Maillard reactants can include a source of a carbohydrate and an amine reactant capable of participating in a Maillard reaction therewith. Also, as noted above, the mixture of Maillard reactants can include a partially reacted mixture of a source of a carbohydrate and an amine reactant. For example, the source of a carbohydrate can be mixed with an amine reactant capable of participating in a Maillard reaction with the source of the carbohydrate and the mixture can be heated to about 90° C. for a time sufficient to initiate the Maillard reaction(s), but not allow the reaction(s) to proceed to completion, before finally formulating the composition.

As the case with the aldehyde based polymers, a binder that includes a mixture of Maillard reactants can also include other ingredients commonly used in such compositions such as an extender, e.g., urea, one or more catalysts for accelerating the cure of the resin such as sodium or ammonium sulfate, melamine, melamine-formaldehyde adducts, silicon-based coupling or compatibilizing agents, corrosion inhibitors, dispersants, biocides, viscosity modifiers, pH adjusters, surfactants, lubricants, defoamers, and the like, and any combination thereof.

The binder can be or include a copolymer of one or more vinyl aromatic derived units and at least one of maleic anhydride and maleic acid. The vinyl aromatic derived units can include, but are not limited to, styrene, alpha-methylstyrene, vinyl toluene, and combinations thereof. Preferably, the vinyl aromatic derived units are derived from styrene and/or derivatives thereof.

In one or more embodiments, the copolymer comprising one or more vinyl aromatic derived units and maleic anhydride (maleic acid). Such copolymer can include of from about 7 mol % to about 50 mol % maleic anhydride and conversely of from about 50 mol % to about 93 mol % vinyl aromatic derived units. In one or more embodiments, the copolymer can include from about 20 mol % to about 40 mol % maleic anhydride and conversely of from about 60 mol % to about 80 mol % vinyl aromatic derived units. In one or more embodiments, the maleic anhydride (maleic acid) can be present in an amount ranging from a low of about 7 mol %, about 10 mol %, about 12 mol %, or about 15 mol % to a high of about 30 mol %, about 35 mol %, about 40 mol %, or about 45 mol %, based on the total weight of the maleic anhydride and the one or more vinyl derived units. In one or more embodiments, the vinyl aromatic derived units can be present in an amount ranging from a low of about 50 mol %, about 55 mol %, about 60 mol %, or about 65 mol % to a high of about 75 mol %, about 80 mol %, about 85 mol %, or about 90 mol %, based the total weight of the maleic anhydride and the one or more vinyl derived units.

The copolymer can contain a minor amount (less than 50 mol %, or less than about 40 mol %, or less than about 30 mol %, or less than about 20 mol %, based on the amount of maleic anhydride (maleic acid)) of another unsaturated carboxylic acid monomer such as aconitic acid, itaconic acid, acrylic acid, methacrylic acid, crotonic acid, isocrotonic acid, citraconic acid, and fumaric acid and the mixtures thereof. The copolymer can also contain a minor amount (less than 50 mol %, or less than about 40 mol %, or less than about 30 mol %, or less than about 20 mol %, based on the amount of the vinyl aromatic derived units) of another hydrophobic vinyl monomer. Another "hydrophobic vinyl monomer" is a monomer that typically produces, as a homopolymer, a polymer that is water-insoluble or capable of absorbing less than 10% by weight water. Suitable hydrophobic vinyl monomers are exemplified by (i) vinyl esters of aliphatic acids such as vinyl acetate, vinyl propionate, vinyl butyrate, vinyl caproate, vinyl 2-ethylhexanoate, vinyl laurate, and vinyl stearate; (ii) diene monomers such as butadiene and isoprene; (iii) vinyl monomers and halogenated vinyl monomers such as ethylene, propylene, cyclohexene, vinyl chloride and vinylidene chloride; (iv) acrylates and alkyl acrylates, such as methyl acrylate, ethyl acrylate, n-propyl acrylate, isopropyl acrylate, n-butyl acrylate, isobutyl acrylate, tert-butyl acrylate, n-hexyl acrylate, cyclohexyl acrylate, and 2-ethylhexyl acrylate; and (v) nitrile monomers such as acrylonitrile and methacrylonitrile and mixtures thereof.

In at least one specific embodiment, the copolymer can be a copolymer of styrene and maleic anhydride (acid) (SMA). The molecular weight of the SMA copolymer can vary within wide limits. The SMA copolymer can have a weight average molecular weight (Mw) of between about 1,000 and about 500,000. For example, the SMA copolymer can have a Mw ranging from a low of about 1,000, about 5,000, about 10,000, about 15,000, or about 20,000 to a high of about 100,000, about 200,000, about 300,000, about 400,000, or about 500,000. In another example, the Mw of the SMA copolymer can range from a low of about 1,000, about 5,000, or about 10,000 up to about 400,000, or about 350,000, or about 300,000, or about 250,000, or about 200,000, or about 175,000, or about 150,000, or about 120,000 or about 100,000, or about 90,000, or about 80,000, or about 70,000, or about 60,000, or about 50,000, or about 40,000, or about 30,000, or about 20,000.

In one or more embodiments, the SMA copolymers can be partially esterified. For example, the SMA copolymers can be partially esterified and can still contain some anhydride groups. The partial esters of the SMA copolymers can be prepared in conventional manners from alkanols of about 3 to 20 carbon atoms, preferably from hexanol or octanol. The extent of the partial-esterification of the SMA copolymers can range from about 5 to 95%, from about 10% to about 80%, from about 20% to about 50%, or from about 15% to about 40%. The esterification can be effected by simply heating a mixture of the appropriate quantities of the SMA copolymers with the alcohol at elevated temperatures, e.g., from about 100° C. to about 200° C. In one or more embodiments, the benzene ring of the SMA copolymers can be substituted with one or more groups. For example, the benzene ring of the SMA copolymers can contain one or more sulfonate groups.

Suitable SMA copolymers are commercially available from numerous companies. For example, suitable SMA copolymers can be purchased from, among others, Polyscope Polymers BV, Sartomer USA, LLC, Hercules, Inc., and Georgia-Pacific Chemical LLC.

In one or more embodiments, the binder comprising the copolymer of maleic anhydride and one or more vinyl aromatic derived units can further include one or more carbohydrates. The one or more carbohydrates can be present in an amount ranging from a low of about 1 wt %, about 3 wt %, or about 5 wt % to a high of about 70 wt %, about 80 wt %, or about 90 wt %, based on the total weight of the binder. In one or more embodiment, the binder can include from about 5 wt % to about 50 wt % carbohydrate(s), based on the total weight of the binder. In one or more embodiments, the binder can include of from about 7.5 wt % to about 15 wt % carbohydrate(s), based on the total weight of the binder. In one or more embodiments, the binder can include from about 5 wt % to about 30 wt % carbohydrate(s), based on the total weight of the binder.

The one or more carbohydrates can include one or more monosaccharides, disaccharides, oligosaccharides, polysaccharides, or any combinations thereof. In one or more embodiments, the one or more carbohydrates can include one or more aldose sugars. In one or more embodiments, the monosaccharide can be or include D-Glucose (dextrose monohydrate), L-Glucose, or a combination thereof. Other carbohydrate aldose sugars can include, but are not limited to, glyceraldehyde, erythrose, threose, ribose, deoxyribose, arabinose, xylose, lyxose, allose, altrose, gulose, mannose, idose, galactose, talose, and any combination thereof.

In one or more embodiments, the binder comprising the copolymer of maleic anhydride and one or more vinyl aromatic derived units can be modified by reaction with one or more amines. Illustrative amines can include, but are not limited to, alkanolamines, polyamines, aromatic amines, and any combination thereof. Illustrative alkanolamines can include, but are not limited to, monoethanolamine (MEA), diethanolamine (DEA), triethanolamine (TEA), or any combination thereof. Preferably, the alkanolamine is a tertiary alkanolamine or more preferably triethanolamine (TEA). An alkanolamine is defined as a compound that has both amino and hydroxyl functional groups as illustrated by diethanolamine, triethanolamine, 2-(2-aminoethoxy)ethanol, aminoethyl ethanolamine, aminobutanol and other aminoalkanols. Illustrative aromatic amines can include, but are not limited to, benzyl amine, aniline, ortho toludine, meta toludine, para toludine, n-methyl aniline, N—N'-dimethyl aniline, di- and tri-phenyl amines, 1-naphthylamine, 2-naphthylamine, 4-aminophenol, 3-aminophenol and 2-aminophenol. Illustrative polyamines can include, but are not limited to, diethylenetriamine (DETA), triethylenetetramine (TETA), tetraethylenepentamine (TEPA). Other polyamines can include, for example, 1,3-propanediamine, 1,4-butanediamine, polyamidoamines, and polyethylenimines.

Other suitable amines can include, but are not limited to, primary amines ($NH_2R_1$), secondary amines ($NHR_1R_2$), and tertiary amines ($NR_1R_2R_3$), where each $R_1$, $R_2$, and $R_3$ can be independently selected from alkyls, cycloalkyls, heterocycloalkyls, aryls, heteroaryls, and substituted aryls. The alkyl can include branched or unbranched alkyls having from 1 to 15 carbon atoms or more preferably from 1 to 8 carbon atoms. Illustrative alkyls can include, but are not limited to, methyl, ethyl, n-propyl, isopropyl, n-butyl, sec butyl, t-butyl, n-pentyl, n-hexyl, and ethylhexyl. The cycloalkyls can include from 3 to 7 carbon atoms. Illustrative cycloalkyls can include, but are not limited to, cyclopentyl, substituted cyclopentyl, cyclohexyl, and substituted cyclohexyl. The term "aryl" refers to an aromatic substituent containing a single aromatic ring or multiple aromatic rings that are fused together, linked covalently, or linked to a common group such as a methylene or ethylene moiety. More specific aryl groups contain one aromatic ring or two or three fused or linked aromatic rings, e.g., phenyl, naphthyl, biphenyl, anthracenyl, phenanthrenyl, and the like. In one or more embodiments, aryl substituents can have from 1 to about 20 carbon atoms. The term "heteroatom-containing," as in a "heteroatom-containing cycloalkyl group," refers to a molecule or molecular fragment in which one or more carbon atoms is replaced with an atom other than carbon, e.g., nitrogen, oxygen, sulfur, phosphorus, boron, or silicon. Similarly, the term "heteroaryl" refers to an aryl substituent that is heteroatom-containing. The term "substituted," as in "substituted aryls," refers to a molecule or molecular fragment in which at least one hydrogen atom bound to a carbon atom is replaced with one or more substituents that are functional groups such as hydroxyl, alkoxy, alkylthio, phosphino, amino, halo, silyl, and the like. Illustrative primary amines can include, but are not limited to, methylamine and ethylamine. Illustrative secondary amines can include, but are not limited to, dimethylamine and diethylamine. Illustrative tertiary amines can include, but are not limited to, trimethylamine and triethylamine.

The addition of one or more carbohydrates to the binder containing the copolymer of maleic anhydride (acid) and one or more vinyl aromatic derived units and/or modifying the binder comprising the copolymer of maleic anhydride and one or more vinyl aromatic derived units can be as discussed and described in U.S. Provisional Patent Application having Ser. No. 61/265,956, filed on Dec. 2, 2009.

In one or more embodiments, the binder can be or include one or more latexes. Illustrative latexes can include, but are not limited to, styrene/acrylic acid ester copolymer, styrene-butadiene rubber, acrylonitrile butadiene styrene, acrylic polymers, polyvinyl acetate, or any combination thereof. The latexes can be prepared using any suitable process. For example, the styrene/acrylic acid ester copolymer (SAE) can be the reaction product of a hydrophobic styrene-based monomer and acrylic acid ester co-polymerized in an emulsion. A suitable SAE copolymer can be prepared as discussed and described in U.S. Pat. No. 6,734,232. A suitable, commercially available SAE can include NOVACOTE® PS, available from Georgia-Pacific Resins, Inc.

In one or more embodiments, the binder can be or include an adduct or polymer of styrene, at least one of maleic anhydride and maleic acid, and at least one of an acrylic acid and an acrylate. Any suitable acrylic acid or acrylate can be used such as methyl methacrylate, butyl acrylate, methacrylate, or any combination thereof. Preferably, the acrylate is methyl methacrylate (MMA). The adduct can be combined with the aldehyde based polymer, the Maillard reactants, or a combination thereof. In another example, the components of the adduct can be mixed with the aldehyde based polymer, the mixture of Maillard reactants, or a combination thereof.

The adduct can be prepared by dissolving the components of the adduct in a suitable solution. Illustrative solutions can include, but are not limited to, aqueous solutions of sodium hydroxide, ammonium hydroxide, potassium hydroxide, and combinations thereof. The solution can be heated to a temperature of about 70° C. to about 90° C. The solution can be held at the elevated temperature until the components are all at least partially in solution. The solution can then be added to the phenol-aldehyde resin, the mixture of Maillard reactants, or the combination of the phenol-aldehyde resin and the mixture of Maillard reactants.

The adduct can be prepared by combining styrene, at least one of maleic anhydride and maleic acid, and at least one of an acrylic acid and an acrylate to form a terpolymer. The amount of styrene in the adduct can range from a low of about 50 wt %, about 55 wt %, or about 60 wt % to a high of about 75 wt %, about 80 wt %, or about 85 wt %, based on the total weight of the adduct. The amount of the maleic anhydride and/or maleic acid in the adduct can range from a low of about 15 wt %, about 20 wt %, or about 25 wt % to a high of about 40 wt %, about 45 wt %, or about 50 wt %, based on the total weigh of the adduct. The amount of the acrylic acid and/or the acrylate in the adduct can range from a low of about 1 wt %, about 3 wt % or about 5 wt % to a high of about 10 wt %, about 15 wt %, or about 20 wt %, based on the total weight of the adduct.

In another example, the acrylic acid or acrylate can be combined with the copolymer of one or more vinyl aromatic derived units and at least one of maleic anhydride and maleic acid to provide the modifier. For example, combining the acrylic acid or acrylate with SMA can form a styrene maleic anhydride methyl-methacrylate terpolymer. In another example, the modifier can also include a physical mixture of styrene acrylic acid and/or styrene-acrylate copolymer and a SMA copolymer. The adduct or polymer of styrene, at least one of maleic anhydride and maleic acid, and at least one of an acrylic acid and an acrylate and the physical mixture of styrene acrylic acid and/or styrene-acrylate copolymer and a SMA copolymer can be prepared according to the processes discussed and described in U.S. Pat. No. 6,642,299.

In one or more embodiments, the binder can be or include one or more polyacrylic acid based polymers. The polyacrylic acid based binder can include an aqueous solution of a polycarboxy polymer, a monomeric trihydric alcohol, a catalyst, and a pH adjuster. The polycarboxy polymer can include an organic polymer or oligomer containing more than one pendant carboxy group. The polycarboxy polymer can be a homopolymer or copolymer prepared from unsaturated carboxylic acids including, but not limited to, acrylic acid, methacrylic acid, crotonic acid, isocrotonic acid, maleic acid, cinnamic acid, 2-methylmaleic acid, itaconic acid, 2-methylitaconic acid, α,β-methyleneglutaric acid, and the like. Other suitable polycarboxy polymers can be prepared from unsaturated anhydrides including, but not limited to, maleic anhydride, itaconic anhydride, acrylic anhydride, methacrylic anhydride, and the like, as well as mixtures thereof.

Illustrative trihydric alcohols can include, but are not limited to, glycerol, trimethylolpropane, trimethylolethane, triethanolamine, 1,2,4-butanetriol, and the like. The one or more trihydric alcohols can be mixed with other polyhydric alcohols. Other polyhydric alcohols can include, but are not limited to, ethylene, glycol, 1,3-propanediol, 1,4-butanediol, 1,6-hexanediol, 2-butene-1, erythritol, pentaerythritol, sorbitol, and the like. The catalyst can include an alkali metal salt of a phosphorous-containing organic acid; particularly alkali metal salts of phosphorous acid, hypophosphorous acid, and polyphosphoric acids. Illustrative catalysts can include, but are not limited to, sodium, sodium phosphite, potassium phosphite, disodium pyrophosphate, tetrasodium pyrophosphate, sodium tripolyphosphate, sodium hexametaphosphate, potassium phosphate, potassium polymetaphosphate, potassium polyphosphate, potassium tripolyphosphate, sodium trimetaphosphate, and sodium tetrametaphosphate, or any combination thereof. Illustrative polyacrylic acid based polymers can be as discussed and described in U.S. Pat. No. 7,026,390.

In one or more embodiments, the aldehyde based binders and/or the Maillard reactant based binders can include one or more modifiers. The modifier can be or include the copolymer comprising one or more vinyl aromatic derived units and at least one of maleic anhydride and maleic acid. In another example, the modifier can be or include the adduct of styrene, at least one of maleic anhydride and maleic acid, and at least one of an acrylic acid and an acrylate. In another example, the modifier can be or include the one or more latexes. In another example, the modifier can include two or more of: (1) a copolymer comprising one or more vinyl aromatic derived units and at least one of maleic anhydride and maleic acid; (2) an adduct of styrene, at least one of maleic anhydride and maleic acid, and at least one of an acrylic acid and an acrylate; and (3) one or more latexes. The addition of the one or more modifiers to the aldehyde based binder and/or the Maillard reactant based binder can be as discussed and described in U.S. patent application Ser. No. 12/860,446, filed on Aug. 20, 2010.

In one or more embodiments, the binder can be extended using any suitable material. For example, the binder can be extended through the addition of urea. In one or more embodiments, the binder can be extended with urea such that the binder has a urea concentration ranging from about 1 wt % to about 50 wt %, based on the combined weight of the binder and the added urea. In another example, the binder extended with urea can have a urea concentration ranging from a low of about 5 wt %, about 15 wt %, or about 25 wt % to a high of about 35 wt %, about 40 wt %, or about 45 wt %, based on the combined weight of the binder and the added urea. In at least one specific embodiment, the aldehyde based binder, the Maillard reactants binder, the copolymer of one or more vinyl aromatic derived units and at least one of maleic anhydride and maleic acid, or any combination thereof, can be extended with urea.

In one or more embodiments, the optional urea can be added to the binder by mixing, blending, or any other process to produce a "premix." The premix can be agitated to homogeneity. After forming the premix, the premix can be allowed to react or prereact for a period of time. For example, the premix can be allowed to react for about 5 hours or more, about 10 hours or more, about 15 hours or more, about 20 hours or more, or about 25 hours or more, after which time it can be stored at 65° F. and used to prepare a composition for up to approximately four days. Premixing the urea with aldehyde-based binders, for example, can reduce the level of free aldehydes, such as formaldehyde, in the aldehyde based binder to a level that does not increase the ammonia demand of binder solutions prepared with the premix.

Other suitable extenders can include, but are not limited to, polysaccharides, sulfonated lignins, and the like. Illustrative polysaccharides can be include, but are not limited to, starch, cellulose, gums, such as guar and xanthan, alginates, pectin, gellan, or any combination thereof. Suitable polysaccharide starches can include, for example maize or corn, waxy maize, high amylose maize, potato, tapioca and wheat starch. Other starches such as genetically engineered starches can include, high amylose potato and potato amylopectin starches. Illustrative sulfonated lignins can include, but are not limited to, sodium lignosulfonate and ammonium lignodulfonate.

In one or more embodiments above or elsewhere herein, the binder can further include one or more oils, one or more film forming polymers, or a combination thereof. Suitable oils and film forming polymers can be as discussed and described above or elsewhere herein.

In one or more embodiments above or elsewhere herein, the binder can further include any combination of two or more binders. As such, a composition that includes a first binder and a second binder can be prepared. In one or more embodiments, the first binder can be present in an amount of from about 1 wt % to about 99 wt %, based on the combined weight of the first binder and the second binder. For example, the first binder can be present in an amount ranging from a low of about 5 wt %, about 15 wt %, about 25 wt %, or about 35 wt % to a high of about 65 wt %, about 75 wt %, about 85 wt %, or about 95 wt %, based on the combined weight of the first binder and the second binder. When three or more binders are combined to provide the binder used in the composition, the three or more binders can be present in any amount. For example, for a combination of three binders, the first binder can be present in an amount of from about 1 wt % to about 98 wt %, the second binder can be present in an amount of from about 1 wt % to about 98 wt %, and the third binder can be present in an amount of from about 1 wt % to about 98 wt %, based on the combined weight of the first, second, and third binders.

In one or more embodiments, the binder can include a combination of the one or more aldehyde based polymers and/or the Maillard reactants and the copolymer comprising one or more vinyl aromatic derived units and at least one of maleic anhydride and maleic acid. In one or more embodiments, the binder can include a combination of the one or more aldehyde based polymers and/or the Maillard reactants and an adduct of styrene, at least one of maleic anhydride and maleic acid, and at least one of an acrylic acid and an acrylate. In one or more embodiments, the binder can include a combination of the one or more aldehyde based polymers and/or the Maillard reactants; and one or more latexes.

The binder can have a solids concentration ranging from a low of about 1 wt %, about 5 wt % or about 10 wt % to a high of about 20 wt %, about 25 wt %, about 30 wt %, about 35 wt %, about 40 wt %, about 45 wt %, or about 50 wt %. For example, the binder can have a solids concentration of from about 5 wt % to about 20 wt %, about 10 wt % to about 30 wt %, about 30 wt % to about 40 wt %, or about 10 wt % to about 25 wt %.

Any one or more of the binders can be blended, mixed, or otherwise combined with the dedusting agent to form or produce the composition. The mixing procedure can be carried out at ambient temperature or at a temperature greater than ambient temperature, for example about 50° C. The composition can be used immediately or stored for a period of time and may be diluted with water to a concentration suitable for the desired method of application, such as by a curtain coater onto the glass fibers.

The composition can have a concentration of the dedusting agent ranging from a low of about 0.1 wt %, about 1 wt %, about 3 wt %, or about 5 wt % to a high of about 10 wt %, about 15 wt %, about 20 wt %, about 25 wt %, about 30 wt %, about 35 wt %, about 40 wt %, about 45 wt %, or about 50 wt %, based on the combined weight of the solid components in the composition. For example, the composition can have a concentration of the dedusting agent ranging from about 1 wt % to about 40 wt %, about 2 wt % to about 30 wt %, about 5 wt % to about 40 wt %, or about 10 wt % to about 35 wt %, based on the combined weight of the solid components in the composition.

The composition can have a concentration of the dedusting agent ranging from about 1 wt % to about 50 wt % or from about 1 wt % to about 30 wt %, or from about 1 wt % to about 20 wt %, based on the combined weight of the binder and the dedusting agent. The composition can have a concentration of the dedusting agent ranging from a low of about 0.1 wt %, about 1 wt %, about 3 wt %, about 5 wt %, or about 7 wt % to a high of about 10 wt %, about 13 wt %, about 15 wt %, about 17 wt %, about 20 wt %, about 23 wt %, or about 25 wt %, based on the combined weight of the binder and the dedusting agent. For example, the composition can have a concentration of the dedusting agent ranging from about 1 wt % to about 20 wt %, about 5 wt % to about 20 wt %, about 3 wt % to about 15 wt %, or from about 10 wt % to about 20 wt %, based on the combined weight of the binder and the dedusting agent.

The components of the composition, e.g., an aldehyde-containing polymer, the dedusting agent, and any additional additives or ingredients can be combined in any order or sequence. For example, all the components of the composition can be simultaneously mixed, blended, or otherwise combined with one another. In another example, the components can be added one after another, with mixing or blending occurring between the addition of components. In another example, some of the components can be mixed or blended together and then other components can be added, e.g., one after another or at the same time, and the mixture can be further mixed to form the composition.

The composition can be applied as a dilute solution to a plurality of fibers. The composition solution can be an aqueous solution. In at least one embodiment, the aqueous solution can be basic, i.e. having a pH of at least 7, such as a pH of 8 or above. The pH can also range from a low of about 6, 7, or 8 to a high of about 9, 10, 11, or 12.

One or more additives can be added to the binder, the dedusting agent, and/or the composition. For example, one or more catalysts for accelerating the cure of the binder such as sodium or ammonium sulfate, melamine, melamine-formaldehyde adducts, silicon-based coupling or compatibilizing agents, corrosion inhibitors, dispersants, biocides, viscosity modifiers, pH adjusters, surfactants, lubricants, defoamers, and any combination thereof can be added to the composition. Other additives or ingredients commonly used in compositions for preparing fiber products can include, but are not limited to, dispersants, biocides, viscosity modifiers, pH adjusters, coupling agents, surfactants, lubricants, defoamers, and the like. For example, the composition can be added to an aqueous solution (white water) of polyacrylamide (PAA), amine oxide (AO), or hydroxyethylcellulose (HEC). In another example, a coupling agent (e.g., a silane coupling agent, such as an organo silicon oil) can also be added to the solution.

In one or more embodiments above or elsewhere herein, the composition can be at least partially cured as a consequence of cross-linking, esterification reactions between pendant carboxyls and hydroxyl groups on the solubilized (hydrolyzed) modified copolymer chains. The composition can further include one or more polyols to increase the crosslink density of the cured binder. Suitable polyols can include, but are not limited to, ethylene glycol, diethylene glycol, triethylene glycol, polyethylene oxide (hydroxy terminated), glycerol, pentaerythritol, trimethylol propane, diethanolamine, triethanolamine, ethyl diethanolamine, methyl diethanolamine, sorbitol, monosaccharides, such as glucose and fructose, disaccharides, such as sucrose, and higher polysaccharides such as starch and reduced and/or modified starches, polyvinyl alcohols, resorcinol, catechol, pyrogallol, glycollated ureas, and 1,4-cyclohexane diol, lignin, or any combination thereof.

As used herein, the terms "curing," "cured," and similar terms are intended to embrace the structural and/or morphological change that occurs in an aqueous (or solvent based) composition, such as by covalent chemical reaction (crosslinking), ionic interaction or clustering, improved adhesion to the substrate, phase transformation or inversion, and/or hydrogen bonding when the composition is dried and heated to cause the properties of a flexible, porous substrate, such as a mat or blanket of fibers, especially glass fibers, to which an effective amount of the composition has been applied, to be altered.

As used herein, the term "cured binder" refers to the cured product of the composition and any added polyol, such that the cured product bonds the fibers of a fibrous product together. Generally, the bonding occurs at the intersection of overlapping fibers.

As used herein, the terms "fiber," "fibrous," "fiberglass," "fiber glass," "glass fibers," and the like are refer to materials that have an elongated morphology exhibiting an aspect ratio (length to thickness) of greater than 100, generally greater than 500, and often greater than 1000. Indeed, an aspect ratio of over 10,000 is possible. Suitable fibers can be glass fibers, natural fibers, synthetic fibers, mineral fibers, ceramic fibers, metal fibers, carbon fibers, or any combination thereof. Illustrative glass fibers can include, but are not limited to, A-type glass fibers, C-type glass fibers, E-type glass fibers, S-type glass fibers, ECR-type glass fibers, wool glass fibers, and any combination thereof. The term "natural fibers," as used herein refers to plant fibers extracted from any part of a plant, including, but not limited to, the stem, seeds, leaves, roots, or phloem. Illustrative natural fibers can include, but are not limited to, cotton, jute, bamboo, ramie, bagasse, hemp, coir, linen, kenaf, sisal, flax, henequen, and any combination thereof. Illustrative synthetic fibers can include, but are not limited to, synthetic polymers, such as polyester, polyamide, aramid, and any combination thereof. In at least one specific embodiment, the fibers can be glass fibers that are wet use chopped strand glass fibers (WUCS). Wet use chopped strand glass fibers can be formed by conventional processes known in the art. The WUCS can have a moisture content ranging from a low of about 5%, about 8%, or about 10% to a high of about 20%, about 25%, or about 30%.

Prior to using the fibers to make a fiberglass product, the fibers can be allowed to age for a period of time. For example, the fibers can be aged for a period of a few hours to several weeks before being used to make a fiberglass product. For fiberglass mat products the fibers can typically be aged for about 3 to about 30 days. Ageing the fibers includes simply storing the fibers at room temperature for the desired amount of time prior to being used in making a fiberglass product.

In one or more embodiments, a method for binding loosely associated, non-woven mat or blanket of fibers can include, but is not limited to (1) contacting the fibers with the composition and (2) heating the curable composition to an elevated temperature, which temperature is sufficient to at least partially cure the composition. Preferably, the composition is cured at a temperature ranging from about 75° C. to about 400° C., usually at a temperature between about 200° C. and up to a temperature of about 350° C. The composition can be cured at an elevated temperature for a time ranging from about 1 second to about 15 minutes. The particular curing time can depend, at least in part, on the type of oven or other heating device design and/or production or line speed.

As noted above, in the making of non-woven fiber products, such as a fiberglass mat and fiberglass insulation, the composition can be formulated into a dilute aqueous solution and then applied, such as by a curtain coating, spraying, or dipping, onto fibers, such as glass fibers. The aqueous solution can be fresh water, process water, or a combination thereof. Compositions containing somewhere between about 1 wt % and about 50 wt % solids are typically used for making fiber products, including glass fiber products. For example, the aqueous composition can have a solids concentration ranging from a low of about 10 wt %, about 13 wt %, about 15 wt %, or about 18 wt % to a high of about 22 wt %, about 26 wt %, about 30 wt %, or about 33 wt %.

The amount of composition applied to the fiberglass product, e.g., a fiberglass mat product, can vary considerably. Loadings typically can range from about 3 wt % to about 45 wt %, about 10 wt % to about 40 wt %, or from about 15 wt % to about 30 wt %, of non-volatile composition based on the dry weight of the bonded fiberglass product. For inorganic fibrous mats, the amount of composition applied to a fiberglass product can normally be confirmed by measuring the percent loss on ignition (% LO") of the fiber mat product. The percent loss on ignition can be measured by weighing a sample of the fiberglass product, ashing the sample at a high temperature, e.g., 650° C., and then re-weighing the residue.

Fiberglass mats can be manufactured in a wet-laid or dry-laid process. In a wet-laid process, chopped bundles of fibers, having suitable length and diameter, can be introduced to an aqueous dispersant medium to produce an aqueous fiber slurry, known in the art as "white water." The white water can typically contain about 0.5 wt % fibers. The fibers can have a diameter ranging from about 0.5 µm to about 30 µm and a length ranging from about 5 mm to about 50 mm, for example. In another example, the fibers can have a diameter ranging from a low of about 1 µm, about 5 µm, or about 10 µm to a high of about 20 µm, about 40 µm, about 50 µm, or about 60 µm. The fibers can be sized or unsized and wet or dry, as long as the fibers can be suitably dispersed within the aqueous fiber slurry.

One or more dispersing agent(s) such as polyacrylamide can be present in an amount ranging from about 10 ppm to about 8,000 ppm, about 100 ppm to about 5,000 ppm, or from about 200 ppm to about 1,000 ppm. The introduction of one or more viscosity modifiers can reduce settling time of the fibers and can improve the dispersion of the fibers in the aqueous solution. The amount of viscosity modifier used can be effective to provide the viscosity needed to suspend the fibers in the white water as needed to form the wet laid fiber product. The optional viscosity modifier(s) can be introduced in an amount ranging from a low of about 1 cP, about 1.5 cP, or about 2 cP to a high of about 8 cP, about 12 cP, or about 15 cP. For example, optional viscosity modifier(s) can be introduced in an amount ranging from about 1 cP to about 12 cP, about 2 cP to about 10 cP, or about 2 cP to about 6 cP. In one or more embodiments, the fiber slurry can include of from about 0.03 wt % to about 25 wt % solids. The fiber slurry can be agitated to produce a uniform dispersion of fibers having a suitable consistency.

The fiber slurry, diluted or undiluted, can be introduced to a mat-forming machine that can include a mat forming screen, e.g., a wire screen or sheet of fabric, which can form a fiber product and can allow excess water to drain therefrom, thereby forming a wet or damp fiber mat. The fibers can be collected on the screen in the form of a wet fiber mat and excess water is removed by gravity and/or by vacuum assist. The removal of excess water via vacuum assist can include one or a series of vacuums.

As discussed above, an at least partially curable composition can be provided as a liquid and applied onto the dewatered wet fiber mat. Application of the composition can be accomplished by any conventional means, such as by soaking the mat in an excess of binder solution or suspension, a falling film or curtain coater, dipping, or the like. The composition can include, for example, from about 5 wt % to about 45 wt % solids. Excess composition can be removed, for example under vacuum.

The composition, after it is applied to the glass fibers, can be at least partially cured. For example, the fiberglass product can be heated to effect final drying and full curing. The duration and temperature of heating can affect the rate of processability and handleability, degree of curing and property development of the treated substrate. The curing temperature can be within the range of from about 50° C. to about 400° C., preferably within the range of from about 90° C. to about 350° C. and the curing time will usually be somewhere between 1 second to about 15 minutes.

On heating, water (or other volatiles) present in the composition evaporates, and the composition undergoes curing. These processes can take place in succession or simultaneously. Curing in the present context is to be understood as meaning the chemical alteration of the composition, for example crosslinking through formation of covalent bonds between the various constituents of the composition, especially the esterification reaction between pendant carboxyl (—COOH) of modified copolymer and the hydroxyl (—OH) moieties both of the modified copolymer and any added polyol(s), the formation of ionic interactions and clusters, and formation of hydrogen bonds.

Alternatively or in addition to heating the fiberglass product catalytic curing can be used to cure the fiberglass product. Catalytic curing of the fiberglass product can include the addition of an acid catalyst. Illustrative acid catalysts can include, but are not limited to, ammonium chloride or p-toluenesulfonic acid.

In one or more embodiments, the drying and curing of the composition can be conducted in two or more distinct steps. For example, the composition may be first heated at a temperature and for a time sufficient to substantially dry but not to fully or completely cure the composition and then heated for a second time at a higher temperature and/or for a longer period of time to effect curing (cross-linking to a thermoset structure). Such a preliminary procedure, referred to as "B-staging", may be used to provide a binder-treated product, for example, in roll form, which may at a later stage be fully cured, with or without forming or molding into a particular configuration, concurrent with the curing process. This makes it possible, for example, to use fiberglass products which can be molded and cured elsewhere.

The fiberglass product can be formed as a relatively thin product having a thickness of about 0.1 mm to about 6 mm, can be formed. In another example, a relatively thick fiberglass product having a thickness of about 10 cm to about 50 cm, or about 15 cm to about 30 cm, or about 20 cm to about 30 cm can be formed. In another example, the fiberglass product can have a thickness ranging from a low of about 0.1 mm, about 1 mm, about 1.5 mm, or about 2 mm to a high of about 5 mm, about 1 cm, about 5 cm, about 10 cm, about 20 cm, about 30 cm, about 40 cm, or about 50 cm. Depending on formation conditions, the density of the product can also be varied from a relatively fluffy low density product to a higher density of about 6 pounds to about 10 pounds per cubic foot or higher. In one or more embodiments, the fiber mat product can have a basis weight ranging from a low of about 0.1 pound, about 0.5 pounds, or about 0.8 pounds to a high of about 3 pounds, about 4 pounds, or about 5 pounds per 100 square feet. For example, the fiber mat product can have a basis weight of from about 0.6 pounds per 100 square feet to about 2.8 pounds per 100 square feet, about 1 pound per 100 square feet to about 2.5 pounds per 100 square feet, or about 1.5 pounds per 100 square feet to about 2.2 pounds per 100 square feet. In at least one specific embodiment, the fiber mat product can have a basis weight of about 1.2 pounds per 100 square feet, about 1.8 pounds per 100 square feet, or about 2.4 pounds per 100 square feet.

The fibers can represent the principal material of the nonwoven fiber products, such as a fiberglass mat product. For example, 60 wt % to about 90 wt % of the fiberglass product, based on the combined amount of binder and fibers can be composed of the fibers. The composition can be applied in an amount such that the cured binder constitutes from about 1 wt % to about 40 wt % of the finished glass fiber product. The composition can be applied in an amount such that the cured binder constitutes a low of from about 1 wt %, about 5 wt %, or about 10 wt % to a high of about 15 wt %, about 20 wt %, or about 25 wt %.

Fiberglass products may be used by themselves or incorporated into a variety of products. For example, fiberglass products can be used as or incorporated into insulation batts or rolls, composite flooring, asphalt roofing shingles, siding, gypsum wall board, roving, microglass-based substrate for printed circuit boards, battery separators, filter stock, tape stock, carpet backing, and as reinforcement scrim in cementitious and non-cementitious coatings for masonry.

In one or more embodiments, fiberglass mats containing one or more of the compositions disclosed herein can have an average dry tensile strength of at least 20 lbs/3 inch; at least 25 lbs/3 inch, at least 30 lbs/3 inch, at least 35 lbs/3 inch, at least 40 lbs/3 inch, at least 45 lbs/3 inch, at least 50 lbs/3 inch, at least 55 lbs/3 inch, at least 60 lbs/3 inch, at least 65 lbs/3 inch, at least 70 lbs/3 inch, at least 75 lbs/3 inch, at least 80 lbs/3 inch, at least 85 lbs/3 inch, at least 90, lbs/3 inch, at least 95 lbs/3 inch, at least 100 lbs/3 inch, or at least 105 lbs/3 inch.

In one or more embodiments, fiberglass mats containing one or more of the compositions disclosed herein can have an average tear strength of about 250 grams force (gf), about 275 gf, about 300 gf, about 325 gf, about 350 gf, about 375 gf, about 400 gf, about 425 gf, 450 gf, about 475 gf, about 500 gf, about 525 gf, about 550 gf, about 575 gf, about 600 gf, about 625 gf, about 650 gf, about 675 gf, about 700 gf, about 725 gf, about 750 gf, about 775 gf, or about 800 gf. In one or more embodiments, fiberglass mats containing one or more of the compositions disclosed herein can have an average tear strength of at least 325 gf, at least 350 gf, at least 375 gf, at least 400 gf, at least 425 gf, at least 450 gf, or at least 475 gf. In one or more embodiments, fiberglass mats containing one or more of the compositions disclosed herein can have an average tear strength of at least 485 gf, at least 490 gf, at least 495 gf, at least 500 gf, at least 505 gf, at least 510 gf, at least 515 gf, at least 520 gf, at least 525 gf, at least 530 gf, at least 535 gf, at least 540 gf, at least 545 gf, at least 550 gf, at least 555 gf, at least 560 gf, at least 565 gf, at least 570 gf, or at least 575 gf. In one or more embodiments, fiberglass mats containing one or more of the compositions disclosed herein can have an average tear strength ranging from a low of about 500 gf, about 525 gf, about 550 gf, or about 575 gf to a high of about 590 gf, about 620 gf, about 650 gf, about 700 gf, about 750 gf, about 800 gf, about 850 gf, or about 900 gf.

In one or more embodiments, fiberglass mats containing one or more of the compositions disclosed herein can have a basis weight (BW) ranging from a low of about 0.5 lbs/100 ft$^2$, about 0.7 lbs/100 ft$^2$, about 0.9 lbs/100 ft$^2$, about 1 lbs/100 ft$^2$, about 1.2 lbs/100 ft$^2$, about 1.4 lbs/100 ft$^2$, about 1.5 lbs/100 ft$^2$, about 1.6 lbs/100 ft$^2$, about 1.7 lbs/100 ft$^2$, or about 1.8 lbs/100 ft$^2$ to a high of about 2 lbs/100 ft$^2$, about 2.1 lbs/100 ft$^2$, about 2.2 lbs/100 ft$^2$, about 2.3 lbs/100 ft$^2$, about 2.4 lbs/100 ft$^2$, about 2.5 lbs/100 ft$^2$, about 2.7 lbs/100 ft$^2$, about 2.9 lbs/100 ft$^2$, or about 3 lbs/100 ft$^2$. For example, the fiberglass mats can have a basis weight of about 1.65 lbs/100 ft$^2$, about 1.75 lbs/100 ft$^2$, about 1.85 lbs/100 ft$^2$, about 1.95 lbs/100 ft$^2$, or about 2.1 lbs/100 ft$^2$.

In one or more embodiments, fiberglass mats containing one or more of the compositions disclosed herein can have a percent of hot-wet retention (% HW) of greater than about 50%, about 55%, about 60%, about 65%, about 70%, about 75%, about 80%, or about 85%. For example, the % HW can range from about 50% to about 80%, about 55% to about 85%, or about 60% to about 80%.

In one or more embodiments, the composition can at least partially dry to a film that a tack tester falls over in less than about 120 seconds, less than about 110 seconds, less than about 100 seconds, less than about 90 seconds, less than about 80 seconds, less than about 70 seconds, less than about 60 seconds, less than about 45 seconds, less than about 30 seconds, less than about 15 seconds, less than about 5 seconds, or less than about 1, once a 300 gram weight is removed after being place for 5 seconds on the base of the tack tester, according to ASTM 1640-03. In one or more embodiments, the composition or dedusting composition can at dry to a film that a tack tester falls over in less than about 120 seconds, less than about 110 seconds, less than about 100 seconds, less than about 90 seconds, less than about 80 seconds, less than about 70 seconds, less than about 60 seconds, less than about 45 seconds, less than about 30 seconds, less than about 15 seconds, less than about 5 seconds, or less than about 1, once a 300 gram weight is removed after being place for 5 seconds on the base of the tack tester, according to ASTM 1640-03. In one or more embodiments, the composition or dedusting composition can form an at least partially dried film that is tack free according to ASTM 1640-03. In one or more embodiments, the composition or dedusting composition can form a dried film that is tack free according to ASTM 1640-03.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

Example I

Two inventive compositions (Ex. 1 and 2) and three comparative compositions (CE1-3) were prepared. For all examples (CE1-3 and Ex. 1 and 2) a premix was prepared by mixing 1142.86 grams of a phenol-formaldehyde polymer and 800 grams of a 40% urea solution. The premix was allowed to pre-react overnight at room temperature. The premix had a non-volatiles content of about 41.2%.

Additional ingredients were then mixed with the premix in a 0.5 gallon jar. Every example included about 364 grams of the premix, about 30 grams of a 20% ammonium sulfate solution, about 3 grams of ammonia, about 0.3 grams of Silane A1100, varying amounts of different dedusting agents, and an appropriate amount of water to produce a composition having about 10% solids.

The mixture of the premix and the additional ingredients was used for the comparative example CE1, i.e. no dedusting agent was added. For comparative example CE2 mineral oil was added as a dedusting agent. The mineral oil was added in the form of an emulsion that contained 50 grams mineral oil, 5 grams of polyethylene glycol (PEG 400), and 45 grams of water. For comparative example CE3, about 5 grams of PEG 400 was added as a dedusting agent.

For inventive example Ex. 1 the dedusting agent added contained a mixture of two components (A and B). Component A was an emulsion of pitch prepared using distilled tall oil (DTO) as the emulsifier. The component A pitch emulsion was manufactured using a Ross bench-top mill (Charles Ross & Son Company). 1200 g of water was heated to 60° C. 16 g of a 50 wt % aqueous NaOH caustic solution was added to the water. The water and caustic mixture was loaded into a stainless steel beaker and the solution was stirred using the Ross bench-top mill. A mixture of tall oil pitch (GP XTOL® Tall Oil Pitch) and distilled tall oil (DTO) (GP XTOL® 520) was separately prepared by mixing 600 g of the tall oil pitch at 60° C. with 200 g of the DTO, which was at 60° C. The pitch and DTO mixture was then added to the stirred water and caustic mixture over approximately 1 minute. No additional heating was supplied during the addition of the pitch and DTO mixture to the water and caustic mixture. The pitch was emulsified upon contact with the aqueous phase, as evidenced by a light tan homogeneous appearance of the product. The emulsion was removed from the Ross bench-top mill after the completion of the raw material addition and was allowed to cool to room temperature.

Component B was a styrene-maleic anhydride solution. 41.2 g of water, 0.04 grams of a defoamer (Taylor TA-103H Antifoam, a commercial silicone defoarmer), 2.4 g of styrene-maleic anhydride copolymer (ENTEL 2612 SMA, manufactured by Ineos ABS), 9.6 g of an additional styrene-maleic anhydride copolymer (XIRAN SZ 26120 SMA, manufactured by Polyscope), 4.4 g of a 28 wt % aqua ammonia solution, and 1.1 g of a 50 wt % aqueous caustic solution were added to a stainless steel reactor. The contents of the reactor were heated to 90° C. and an additional 40.0 grams of water were added. The mixture was further heated to 105° C. and maintained at 105° C. for 2.5 hours to solubilize the SMA. The solution was then cooled to 40° C. and additional defoamer (0.004 g) was added and the solution was cooled to room temperature. The styrene-maleic anhydride solution (component B) contained about 13% by weight solids in water.

The pitch emulsion was made by mixing at room temperature 100 grams of component A and 30.8 grams of component B. The dedusting agent used in EX. 1 was this mixture of Components A and B.

For the inventive example (Ex. 2) the dedusting agent was an aqueous solution that contained about 37.1 wt % tall oil pitch, about 12.4 wt % distilled tall oil (DTO), about 49.5 wt % water, and about 1 wt % of a 50% sodium hydroxide solution. The dedusting agent used in Ex. 2 was prepared in similar manner as component A discussed above. The composition of each example is shown in Table 1.

Handsheets for each example (CE1-3 and Ex. 1 and 2) were prepared by making glass fiber sheets, soaking the sheets in the compositions, vacuuming the excess binder off the sheets, and curing the sheets in an oven at 205° C. for 90 seconds. The handsheets were cut into six pieces measuring 3 inches wide by 5 inches long. The thickness of the handsheets prior to curing, i.e. while wet, were not measured. The thickness of the handsheets after curing was about 35 mils. The glass fibers for all examples had an average length of about 1.25 inches. Each set was tested for dry and hot/wet tensile strength on a Thwing-Albert tensile tester (0-200 kg load cell). The hot/wet tensile strengths were measured by soaking the handsheets in water at 185° F. for 10 minutes immediately prior to breaking the handsheets in the tensile tester. The results of the handsheet studies are shown in Table 2.

TABLE 2

|  | Avg Dry Tensile, lbs/3 inch | Avg Hot/Wet Tensile, lbs/3 inch |
|---|---|---|
| CE1 | 76 | 60 |
| CE2 | 75 | 62 |
| CE3 | 85 | 62 |
| Ex. 1 | 90 | 74 |
| Ex. 2 | 82 | 64 |

The binder stability was determined by visual observation. The binders were visually observed over a 24 hour period looking for signs of precipitation and separation. The binders for CE1, Ex. 1, and Ex. 2 had good stability, were stable overnight, and did not exhibit any signs of separation or precipitation. The binder for CE2 (mineral oil) was not stable. The binder for CE3 became cloudy when the PEG 400 was added.

As shown in Table 2, the inventive dedusting agents used in examples 1 and 2 exhibited both dry and hot/wet tensile strengths equal to or better than the comparative examples (CE1-3).

Example II

Seven inventive compositions (Ex. 3-9) and three comparative compositions were prepared. For all examples, a premix was prepared by mixing a phenol-formaldehyde polymer with a 50 wt % urea solution. The premix had a 35 wt % concentration of the urea solution. The premix was allowed to pre-react overnight for about 18 hours at room temperature Ammonium sulfate (7.6 wt %) was added to the premix as a catalyst and ammonium hydroxide (0.8 wt %) was added to adjust the pH to about 8.8. The premix was then diluted with water to form a premix having a concentration of about 10 wt % solids.

TABLE 1

|  | Premix (g) | 20% (NH$_4$)$_2$SO$_4$ solution (g) | NH$_3$ (g) | Min. Oil (g)$^1$ | PEG 400 (g) | Pitch Emulsion and SMA (g) | Pitch, DTO, water, base (g) | Silane A1100 (g) | Water (g) |
|---|---|---|---|---|---|---|---|---|---|
| CE1 | 364.29 | 30 | 3 |  |  |  |  | 0.3 | 1102.71 |
| CE2 | 364.29 | 30 | 3 | 30 |  |  |  | 0.3 | 1072.71 |
| CE3 | 364.29 | 30 | 3 |  | 15 |  |  | 0.3 | 1087.71 |
| Ex. 1 | 364.29 | 30 | 3 |  |  | 46.9 |  | 0.3 | 1055.84 |
| Ex. 2 | 364.29 | 30 | 3 |  |  |  | 37.5 | 0.3 | 1065.21 |

Mineral oil, a dedusting agent, styrene maleic anhydride, or a combination thereof were added to the premixes. The mineral oil was an emulsion containing 7.5 g polyethyleneglycol (PEG 400), 50 g mineral oil, and 45 g of deionized water. The emulsion was mixed for about five minutes prior to use. The dedusting agent was a 50% emulsion containing 3 parts pitch and 1 part distilled tall oil. The SMA was a 13% solution of styrene maleic anhydride in water. The specific blends prepared for the comparative examples (CE4-6) and the inventive examples (Ex. 3-9) are shown in Table 3 below.

TABLE 3

| Ex. No. | Premix, 10 wt % solids | Mineral Oil | Dedusting Agent | SMA | Order of Tack |
|---|---|---|---|---|---|
| CE4 | 10.00 | | | | 9 |
| CE5 | 9.00 | 1.00 | | | 1 |
| CE6 | 9.50 | 0.50 | | | 2 |
| Ex. 3 | 9.00 | | 1.00 | | 10 |
| Ex. 4 | 9.00 | | 1.00 | 1.0 | 4 |
| Ex. 5 | 9.50 | | 0.50 | | 8 |
| Ex. 6 | 9.50 | | 0.50 | 0.5 | 3 |
| Ex. 7 | 9.50 | 0.50 | 0.50 | | 5 |
| Ex. 8 | 9.75 | 0.25 | 0.25 | | 7 |
| Ex. 9 | 9.67 | 0.33 | 0.33 | | 6 |

Draw down films were made with all the blends shown in Table 2 using an 8 mm draw down square and a 2.5 g sample. The films were allowed to dry in an oven for about 10 minutes at 205° C. The level of tack was tested by contacting the film with a gloved finger. According to the tackiness or level of adhesion between the gloved finger and the film, the films were ranked in order of tackiness, with 1 corresponding to the least tack and 10 corresponding to the most tack. The testing procedure according to ASTM 1640-03, section 7.5 was followed.

The two compositions containing the premix and the mineral oil (CE5 and CE6) had the lowest tack of all the samples evaluated and were ranked 1 and 2, respectively. As the level of mineral oil decreased the tack increased. The addition of the dedusting agent to the premix produced a sample having the highest level of tack (Ex. 3) Decreasing the amount of the dedusting agent reduced the level of tack, as shown by Ex. 5.

The addition of the SMA to the binder having both the premix and the dedusting agent produced samples having a reduced level of tack (EX. 4 and 6). For example, EX. 3 contained the premix and the dedusting agent and showed a higher tack than EX. 4, which contained the same amount of premix and dedusting agent as EX. 3, but further included SMA.

Embodiments of the present disclosure further relate to any one or more of the following paragraphs:

1. A composition, comprising: a binder; and a dedusting agent comprising an emulsion comprising one or more pitches, one or more fatty acids, one or more rosins, or any combination thereof.

2. A fiberglass product, comprising: a plurality of fibers; and the composition according to paragraph 1, wherein the composition is at least partially cured.

3. A process for preparing a fiberglass product, comprising: contacting a plurality of fibers with the composition according to paragraph 1; collecting the contacted fibers to form a non-woven mat; and heating the non-woven mat to at least partially cure the composition.

4. The composition according to any one paragraphs 1 to 3, wherein the binder comprises an aldehyde containing polymer, a mixture of Maillard reactants, a copolymer of one or more vinyl aromatic derived units and at least one of maleic anhydride and maleic acid, or any combination thereof.

5. The composition according to paragraph 4, wherein the mixture of Maillard reactants comprises at least one polycarboxylic acid, at least one of ammonia and an amine, and at least one carbohydrate source.

6. The composition according to paragraph 4, wherein the mixture of Maillard reactants comprises ammonia, citric acid, and dextrose.

7. The composition according to any one of paragraphs 1 to 3, wherein the binder comprises an aldehyde containing polymer, and wherein the aldehyde containing polymer comprises a urea-formaldehyde polymer, a phenol-formaldehyde polymer, a melamine-formaldehyde polymer, or any combination thereof.

8. The composition according to any one of paragraphs 1 to 7, wherein the binder is combined with an extender to from a premix, and wherein the premix is combined with the dedusting agent.

9. The composition according to any one of paragraphs 1 to 8, wherein the emulsion comprises water, a pitch, and a distilled tall oil.

10. The composition according to any one of paragraphs 1 to 9, wherein the pitch comprises a tall oil pitch.

11. The composition according to any one of paragraphs 1 to 10, wherein the emulsion has a concentration of water ranging from about 30 wt % to about 75 wt %, a concentration of pitch ranging from about 20 wt % to about 50 wt %, and a concentration of distilled tall oil ranging from about 5 wt % to about 20 wt %, based on the combined weight of the water, pitch, and distilled tall oil.

12. The composition according to any one of paragraphs 1 to 11, wherein the emulsion comprises water, a pitch, a distilled tall oil, and a base compound, and wherein the emulsion has a concentration of water ranging from about 30 wt % to about 75 wt %, a concentration of pitch ranging from about 20 wt % to about 50 wt %, a concentration of distilled tall oil ranging from about 5 wt % to about 20 wt %, and a concentration of base compound ranging from about 0.1 wt % to about 5 wt %, based on the combined weight of the water, pitch, distilled tall oil, and base compound.

13. The composition according to any one of paragraphs 1 to 12, wherein a source for at least a portion of the one or more pitches, one or more fatty acids, and one or more rosins comprises crude tall oil.

14. The composition according to any one of paragraphs 1 to 13, wherein a source for at least a portion of the one or more pitches, the one or more fatty acids, and the one or more rosins is derived from crude tall oil.

15. The composition according to any one of paragraphs 1 to 14, wherein the dedusting agent further comprises one or more oils.

16. The composition of according to any one of paragraphs 1 to 15, wherein the dedusting agent further comprises one or more mineral oils.

17. The composition according to any one of paragraphs 15 to 16, wherein the one or more oils is present in an amount ranging from about 1 wt % to about 50 wt %, based on the combined weight of the one or more oils and the emulsion.

18. The composition according to any one of paragraphs 15 to 17, wherein the one or more oils has a flash point greater than about 200° C.

19. The composition according to any one of paragraphs 1 to 18, wherein the dedusting agent further comprises one or more film forming polymers.

20. The composition according to any one of paragraphs 1 to 19, wherein the dedusting agent is present in an amount ranging from about 0.1 wt % to about 20 wt %, based on the combined weight of the binder and the dedusting agent.

21. The composition according to any of paragraphs 1 to 20, wherein the combined weight of the one or more pitches, one or more fatty acids, and one or more rosins in the emulsion ranges from about 10 wt % to about 60 wt %, based on the total weight of the emulsion.

22. The composition according to any one of paragraphs 1 to 21, wherein the emulsion further comprises a base compound.

23. The fiberglass product according to paragraph 2, wherein the fiberglass product is a non-woven mat.

24. The fiberglass product according to paragraph 22, wherein the non-woven mat has a thickness of from about 1 mm to about 50 cm.

25. The fiberglass product according to paragraph 2, wherein the plurality of fibers have a length of from about 3 mm to about 50 mm and a diameter of from about 5 μm to about 40 μm.

26. The process according to paragraph 3, wherein the plurality of fibers have a length of from about 3 mm to about 50 mm and a diameter of from about 5 μm to about 40 μm.

27. The composition according to any one of paragraphs 1 to 26, wherein at least a portion of the one or more pitches, the one or more fatty acids, and the one or more rosins are provided in the form of crude tall oil, are derived from crude oil, or a combination thereof.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A composition, comprising:
   a binder; and
   a dedusting agent comprising:
      at least one pitch, and
      at least one additive comprising one or more fatty acids, one or more rosins, or a mixture of one or more fatty acids and one or more rosins,
      wherein the pitch is present in an amount of about 10 wt % to about 80 wt %, based on the combined weight of the pitch and the additive.

2. The composition of claim 1, wherein the additive is provided in the form of crude tall oil, tall oil fatty acids, distilled tall oil, tall oil rosins, or any mixture thereof.

3. The composition of claim 1, wherein the dedusting agent further comprises at least one base compound in an amount of about 0.1 wt % to about 5 wt %, based on the combined weight of the pitch, the additive, and the base compound.

4. The composition of claim 1, wherein the pitch is present in an amount of about 20 wt % to about 80 wt %, based on the combined weight of the pitch and the additive, and wherein the dedusting agent is present in an amount of about 1 wt % to about 50 wt %, based on the combined weight of the binder and the dedusting agent.

5. The composition of claim 1, wherein the pitch is present in an amount of about 35 wt % to about 80 wt %, based on the combined weight of the pitch and the additive, and wherein the dedusting agent is present in an amount of about 5 wt % to about 30 wt %, based on the combined weight of the binder and the dedusting agent.

6. The composition of claim 1, wherein the pitch is present in an amount of about 50 wt % to about 80 wt %, based on the combined weight of the pitch and the additive, and wherein the dedusting agent is present in an amount of about 10 wt % to about 20 wt %, based on the combined weight of the binder and the dedusting agent.

7. The composition of claim 1, wherein the dedusting agent is in the form of an emulsion.

8. The composition of claim 1, wherein the pitch comprises a tall oil pitch.

9. The composition of claim 1, further comprising one or more oils selected from the group consisting of mineral oils, soy bean oil, rapeseed oil, sunflower oil, corn oil, peanut oil, cotton oil, palm, oil, palm kernel oil, coconut oil, and mixtures thereof.

10. The composition of claim 1, wherein the composition dries to a film that is tack free, according to ASTM 1640-03.

11. The composition of claim 1, wherein the dedusting agent further comprises water and at least one base compound, and wherein:
   the water is present in an amount of about 20 wt % to about 80 wt %, based on the weight of the dedusting agent;
   the base compound is present in an amount of about 0.1 wt % to about 5 wt %, based on the combined weight of the pitch, the additive, and the base compound;
   the additive comprises the fatty acids; and
   the fatty acids are present in an amount of about 10 wt % to about 40 wt %, based on the combined weight of the pitch, the additive, and the base compound.

12. The composition of claim 1, wherein the binder comprises an aldehyde based resin, a copolymer of one or more vinyl aromatic derived units and at least one of maleic anhydride and maleic acid, a mixture of Maillard reactants, or any mixture thereof.

13. The composition of claim 1, wherein the binder comprises an aldehyde based resin, and wherein the aldehyde based resin comprises a urea-formaldehyde polymer, a phenol-formaldehyde polymer, a melamine-formaldehyde polymer, or any mixture thereof.

14. The composition of claim 1, wherein the composition further comprises one or more mineral oils, a copolymer of styrene and acrylic acid, a copolymer of styrene and maleic anhydride, a copolymer of styrene and maleic acid, a copolymer of styrene and butadiene, a copolymer of styrene and isoprene, or any mixture thereof.

15. A method for making a fiberglass product, comprising:
contacting a plurality of fibers with a composition, the composition comprising:
a binder; and
a dedusting agent comprising:
at least one pitch, and
at least one additive comprising one or more fatty acids, one or more rosins, or a mixture of one or more fatty acids and one or more rosins,
wherein the pitch is present in an amount of about 10 wt % to about 80 wt %, based on the combined weight of the pitch and the additive; and
heating the contacted fibers to at least partially cure the composition.

16. The method of claim 15, wherein the composition further comprises one or more mineral oils, a copolymer of styrene and acrylic acid, a copolymer of styrene and maleic anhydride, a copolymer of styrene and maleic acid, a copolymer of styrene and butadiene, a copolymer of styrene and isoprene, or any mixture thereof.

17. A fiberglass product, comprising:
a plurality of fibers; and
an at least partially cured composition, wherein the composition, prior to curing, comprises:
a binder; and
a dedusting agent comprising:
at least one pitch, and
at least one additive comprising one or more fatty acids, one or more rosins, or a mixture of one or more fatty acids and one or more rosins,
wherein the pitch is present in an amount of about 10 wt % to about 80 wt %, based on the combined weight of the pitch and the additive.

18. The fiberglass product of claim 17, wherein the composition further comprises one or more mineral oils, a copolymer of styrene and acrylic acid, a copolymer of styrene and maleic anhydride, a copolymer of styrene and maleic acid, a copolymer of styrene and butadiene, a copolymer of styrene and isoprene, or any mixture thereof.

19. The composition of claim 1, wherein the pitch comprises about 30 wt % to about 90 wt % unsaponifiable material, and wherein the pitch is present in an amount of about 35 wt % to about 80 wt %, based on the combined weight of the pitch and the additive.

20. The composition of claim 19, wherein the pitch has an acid value of about 20 to about 50.

* * * * *